US012704673B2

(12) United States Patent
Koglbauer et al.

(10) Patent No.: US 12,704,673 B2
(45) Date of Patent: Aug. 11, 2026

(54) WAVEGUIDE AND METHOD FOR PRODUCING A WAVEGUIDE

(71) Applicant: SCHOTT AG, Mainz (DE)

(72) Inventors: Andreas Koglbauer, Trebur (DE); Andreas Ortner, Gau-Algesheim (DE); Oliver Sohr, Mainz (DE); David Sohr, Mainz (DE); Andrea Ravagli, Mainz (DE)

(73) Assignee: SCHOTT AG, Mainz (DE)

(*) Notice: Subject to any disclaimer, the term of this patent is extended or adjusted under 35 U.S.C. 154(b) by 0 days.

(21) Appl. No.: 18/145,820

(22) Filed: Dec. 22, 2022

(65) Prior Publication Data

US 2023/0236358 A1 Jul. 27, 2023

Related U.S. Application Data

(63) Continuation of application No. PCT/EP2021/066986, filed on Jun. 22, 2021.

(30) Foreign Application Priority Data

Jun. 22, 2020 (DE) .................... 10 2020 116 444.0

(51) Int. Cl.
*G02B 6/06* (2006.01)
*G02B 6/02* (2006.01)
*G02B 6/08* (2006.01)

(52) U.S. Cl.
CPC .......... *G02B 6/06* (2013.01); *G02B 6/02357* (2013.01); *G02B 6/08* (2013.01); *G02B 6/02042* (2013.01)

(58) Field of Classification Search
CPC .. G02B 6/02042; G02B 6/02357; G02B 6/06; G02B 6/08
See application file for complete search history.

(56) References Cited

U.S. PATENT DOCUMENTS 5,299,275 A 3/1994 Jackson
5,862,285 A * 1/1999 Danielian ................ G02B 6/06 385/116

(Continued)

FOREIGN PATENT DOCUMENTS

EP 1784667 2/2016
JP H10260337 9/1998

(Continued)

OTHER PUBLICATIONS

Tuan, "All-solid tellurite optical fiber with transversely-disordered refractive index profile and its optical image transport performance", Optical Components and Materials XV, Proc. of SPIE, vol. 10528, 2018.

(Continued)

*Primary Examiner* — Daniel Petkovsek
(74) *Attorney, Agent, or Firm* — Ruggiero McAllister & McMahon LLC

(57) ABSTRACT

A waveguide is provided for transmitting electromagnetic waves, in particular for transmitting image information, from a proximal end to a distal end, along a transport direction running between the ends and a via a cross-section running transversely to the transport direction. The waveguide has a plurality of structural elements, wherein at least two different types of structural elements have a first type with a first refractive index and a second type with a second refractive index. Each of the structural dements extends along the transport direction and over a part of the cross-section of the waveguide such that a plurality of cross-sectional regions are defined in the cross-section of the waveguide, each cross-sectional region corresponding to the cross-section of an individual structural element.

30 Claims, 18 Drawing Sheets

(56) References Cited

U.S. PATENT DOCUMENTS

| | | | | |
|---|---|---|---|---|
| 6,865,325 | B2 | 3/2005 | Ide | |
| 10,578,797 | B2 * | 3/2020 | Abaie | G02B 6/02342 |
| 10,877,210 | B2 * | 12/2020 | Karafin | G02B 30/33 |
| 11,137,538 | B2 * | 10/2021 | Borrelli | G02B 6/02361 |
| 11,165,508 | B2 * | 11/2021 | Borrelli | G02B 1/005 |
| 11,401,196 | B2 * | 8/2022 | Li | C03B 37/01453 |
| 2005/0232561 | A1 | 10/2005 | Murofushi | |
| 2015/0316714 | A1 * | 11/2015 | Tsuchida | H01S 3/06754 385/127 |
| 2017/0123146 | A1 | 5/2017 | Chen | |
| 2018/0372958 | A1 * | 12/2018 | Karafin | G02B 6/04 |
| 2019/0382301 | A1 | 12/2019 | Stone | |
| 2019/0384024 | A1 | 12/2019 | Neukirch | |
| 2020/0225409 | A1 | 7/2020 | Kreski | |
| 2020/0348463 | A1 * | 11/2020 | Mukasa | G02B 6/02342 |
| 2021/0124114 | A1 * | 4/2021 | Karafin | G02B 3/0037 |
| 2025/0130366 | A1 | 4/2025 | Koglbauer | |
| 2025/0355162 | A1 | 11/2025 | Ravagli | |

FOREIGN PATENT DOCUMENTS

| | | |
|---|---|---|
| WO | 2009003228 | 1/2009 |
| WO | 2020076387 | 4/2020 |
| WO | 2025021671 A1 | 1/2025 |

OTHER PUBLICATIONS

Gissibl, "Two-photon direct laser writing of ultracompact multi-lens objectives", Nature Photonics, vol. 10, Aug. 2016.

Mafi, "Disordered Anderson Localization Optical Fibers for Image Transport—A Review", Journal of Lightwave Technology, vol. 37, No. 22, Nov. 15, 2019.

Mafi, "Transverse Anderson localizotion of light: a Tutorial", Advances in Optics and Photonics 7, 459-515 (2018).

Tanzid, "Imaging through plasmonic nanoparticles", Proceedings of the National Academy of Sciences, 2016.

Karbasi, "Image transport through a disordered optical fibre mediated by transverse Anderson localization", Nature Communications, Feb. 25, 2014.

English Translation of the International Search Report dated Nov. 18, 2021 for PCT/EP 2021/066986, 5 pages.

English Translation of the Written Opinion of the International Searching Authority dated May 25, 2021 for PCT/EP 2021/066986, 11 pages.

Sgrignuoli, "Light localization transition in three-dimensional subrandom arrays", arxiv.org, Cornell University Library, 201 Olin Library Cornell University Ithaca, NY 14853, Mar. 4, 2020, 11 pages.

Peipei, "Quasiperiodic Nanohole Arrays on Optical Fibers as Plasmonic Sensors: Fabrication and Sensitivity Determination", ACS Sensors, Bd. 1, Nr. 8, Aug. 26, 2016, 6 pages.

Sivankutty, "Nonlinear imaging through a golden spiral multicore fiber", Optics Letters, arxiv.org, Cornell University Library, 201 Olin Library Cornell University Ithaca, NY 14853, Jun. 5, 2018, 5 pages.

Nguyen, "Quantum Walks in Periodic and Quasiperiodic Fibonacci Fibers", Science and Technology Division, Corning Research and Development Corporation, Sullivan Park, Corning, NY 148314. Nov. 2019, 22 pages.

English Translation of the International Preliminary Report on Patentability dated Dec. 13, 2022 for PCT/EP 2021/066986, 12 pages.

Zhao, "Image Transport Through Meter-Long Randomly Disordered Silica-Air Optical Fiber", Feb. 15, 2018, www.nature.com/scientificreports, (2018) 8:3065, DOI:10.1038/s41598-018-21480-0.

* cited by examiner 10,20
10,20
10a
10b
1

10,20
10,20
10,20
10,20
10a
10b
10b
1

10,20
10,20
10,20
10a
10b
1

10,20
10,20
10,20
10a
10b
10c
1

10,20
10,20
10,20
10,20
10a
10b
10c
1

242
240

242
240

242
240

242
240

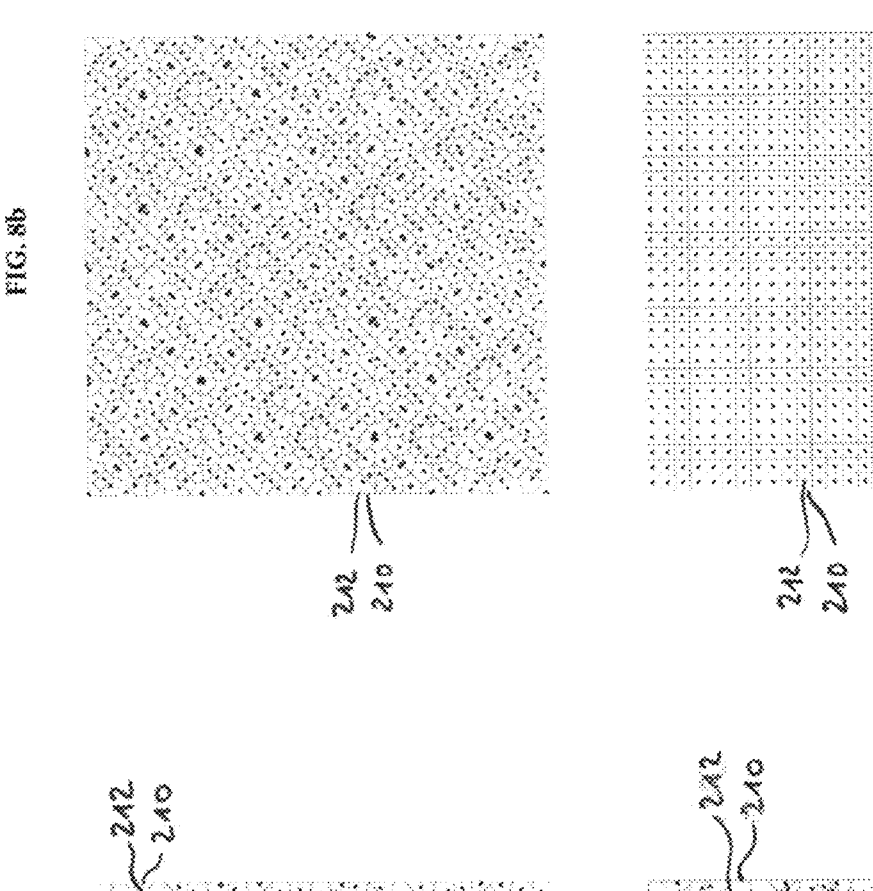
FIG. 8b
FIG. 8d
FIG. 8a
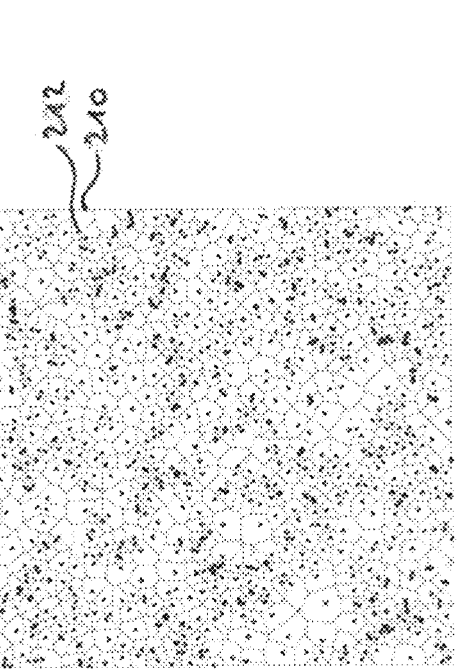
FIG. 8c 1
10a

1
P
10a

1
P
10a 1
10c
10a
10b 1
10b
10a 1
10c
10a
10b 10b
10a
10b
10a
1

10a, 10b
10c

1

WAVEGUIDE AND METHOD FOR PRODUCING A WAVEGUIDE

CROSS REFERENCE TO RELATED APPLICATIONS

This application is a continuation of International Application PCT/EP2021/066986 filed Jun. 22, 2021, which claims the benefit under 35 USC § 119 of German Application DE 10 2020 116 444.0 filed Jun. 22, 2020, the entire contents of both of which are incorporated herein by reference.

BACKGROUND

1. Field of the Invention

The invention relates to a waveguide for transmitting electromagnetic waves, in particular for transmitting image information, and to a method for producing a waveguide, in particular an image guide.

2. Description of Related Art

Image guides typically consist of a multiplicity of individual light waveguides, which respectively consist of a core and a cladding enclosing the core, the light waveguides being assembled as bundles and being arranged in cross section in a grid with a one-to-one relation between the light entry face and the light exit face, in order to form a multiplicity of pixels. In principle, each pixel is used to transmit one brightness value, or one color information item, through the image guide.

Often, a resolution of the image guide which is as high as possible is desirable in practice. A high resolution may in principle be achieved by reducing the diameters of the individual light waveguides. Because of the laws of physics, however, the resolution cannot be increased arbitrarily since, with ever smaller diameters of the individual light waveguides, an ever larger fraction of the field distribution of the transmitted modes exceeds the dimensions of the light waveguides, in particular of the cladding, which leads to increased crosstalk between neighboring light waveguides and therefore to increasing unsharpness.

One approach for providing image guides having a higher resolution is based on the wave phenomenon of transverse Anderson localization (TAL). In this case, use is made of the fact that a random distribution of refractive indices over the cross section of the image guide with simultaneous invariance of the refractive indices along the length of the image guide leads to a limitation of the light introduced in cross section due to destructive interference. In practice, for example, a multiplicity of individual glass fibers having different refractive indices may be assembled to form a random fiber bundle. If a light beam is introduced into such a waveguide, it propagates along the length of the image guide with a limited transverse extent in cross section.

Although image guides which are based on the principle of transverse Anderson localization on the one hand allow higher resolutions, on the other hand the random distribution of the refractive indices leads to the disadvantage that the image quality, in particular the image sharpness, of the transmitted image information is subject to local fluctuations, or is difficult to control. For instance, the image sharpness in particular zones of the cross section may thus differ from the image sharpness in other zones of the cross section.

Such inhomogeneities make it more difficult in practice to produce image guides having a particular quality standard. Depending on which quality criteria are applied for production, a high rejection rate may occur. The aforementioned problems are further exacerbated if the cross-sectional area of the image guide is intended to have large dimensions. This applies in particular to faceplates, in which the edge length or the diameter of the cross section sometimes exceeds the thickness of the faceplate by several times.

A faceplate typically means a group of often relatively short (a few mm) fused optical fibers or optical structural elements, the axes of which are perpendicular to the plate surface (a few $mm^2$ to many $cm^2$). Their key property is to allow image transmission identically in strict order, i.e. 1:1, or varied according to a rule, for example rotated, from one plate surface to the other plate surface.

It is therefore an object of the invention to specify waveguides, in particular image guides, as well as a method for the production thereof, which ensure an increased homogeneity, in particular of the image sharpness, over the cross section of the waveguide. One aspect of the object of the invention is to make the homogeneity better controllable, particularly preferably even reproducible, over the cross section, for example, in order to avoid rejects during production and to be able to reliably ensure quality standards.

One aspect of the object of the invention consists in being able to provide waveguides, in particular image guides, having large cross-sectional areas, which at the same time comply with the aforementioned conditions, in particular a defined homogeneity. This applies particularly to waveguides configured as a faceplate.

In order to achieve the object, the present invention discloses a waveguide for transmitting electromagnetic waves, in particular for transmitting image information, from a proximal end of the waveguide to a distal end of the waveguide, along a transport direction running between the proximal end and the distal end, and over a cross section running transversely with respect to the transport direction, wherein the waveguide comprises a multiplicity of structural elements.

At least two different types of structural elements are included, namely a first type having a first refractive index and a second type having a second refractive index. The multiplicity of structural elements included may accordingly comprise at least one structural element of the first type and one or more structural elements of the second type, or conversely one or more structural elements of the first type and a structural element of the second type, or else both a plurality of structural elements of the first type and a plurality of structural elements of the second type. Of course, more than two different types of structural elements may also be included, for example three different types.

The structural elements respectively extend along the transport direction and partly over the cross section of the waveguide, in such a way that a multiplicity of cross-sectional regions are defined in the cross section of the waveguide, each of which correspond to the cross section of an individual structural element. The structural elements accordingly run next to one another, in particular parallel to one another, along the transport direction of the waveguide, and their cross sections respectively take up an area fraction of the cross section of the waveguide and therefore respectively define a cross-sectional region of the cross section of the waveguide. The cross-sectional regions thus correspond in particular to the area zones formed by the structural elements when looking at a cross-sectional area of the waveguide, that is to say for example the light entry face or light exit face.

According to the invention, the structural elements, in particular the cross-sectional regions thereof, are in this case configured nonuniformly but in a way which is uniquely established by a predetermined rule. The structural elements therefore have a nonuniformity in relation to one another, that is to say they are configured nonuniformly, for example arranged nonuniformly, shaped nonuniformly and/or constituted nonuniformly with respect to one another. In particular, the nonuniformity in this case does not respectively lie in the individual structural elements themselves, but rather in the totality of the structural elements, there is accordingly in particular a physical disorder, that is to say a deviation from a symmetry or the symmetry. On the other hand, the nonuniformly configured structural elements are configured in a way which is established by a predetermined rule, that is to say they are not randomly configured. The property that the structural elements have a nonuniformity or a disorder with respect to one another thus contrasts with a regularity, particularly in the sense that the nonuniformity or the disorder follows a defined rule and not chance. In particular, the nonuniformity or the disorder is nevertheless uniquely predetermined or preset by a rule, or characterized or characterizable by a rule.

The nonuniformity of the structural elements, in particular the cross-sectional regions thereof, may be manifested in various ways.

For example, the cross-sectional regions of the structural elements may have a nonuniform, in particular aperiodic, arrangement which is uniquely established by the predetermined rule. For example, the cross-sectional regions may be arranged differently than a periodic grid. The cross-sectional regions may, however, for example also be distributed nonuniformly over a periodic grid.

Alternatively or in addition, the cross-sectional regions of the structural elements may have geometries which are nonuniform with respect to one another, in particular different to one another, have for example nonuniform diameters, which are uniquely established by the predetermined rule. The geometries of the cross-sectional regions may however also be configured identically but twisted relative to one another, particularly in the case of cross-sectional regions which have a non-round shape.

Furthermore, the structural elements may alternatively or in addition have refractive indices which are nonuniform with respect to one another, in particular different to one another and are uniquely established by the predetermined rule.

In particular because of the physical effect of transverse Anderson localization, a limitation particularly of the amplitude of a transmitted electromagnetic wave to a partial zone of the cross section of the waveguide may be achieved by the nonuniformity of the structural elements. The structural elements, in particular the cross-sectional regions thereof, are accordingly in particular configured nonuniformly in such a way that electromagnetic waves which are transmitted by the waveguide remain localized in a direction running transversely with respect to the transport direction, particularly in order to transmit electromagnetic waves, optionally selected wavelength ranges, particularly including visible and/or infrared and/or ultraviolet light, in particular image information, directionally or restrictedly. In this case, image information may be transmitted with high sharpness because of the limitation of the propagation of light in the waveguide according to the invention, in which case the sharpness may be improved in comparison with conventional fiber-optic image guides.

On the other hand, the structural elements, in particular the cross-sectional regions thereof, are configured as established by the predetermined rule in such a way that the waveguide has a reproducible structure, particularly in such a way that further waveguides may be produced with an identical structure to the waveguide. In other words, the nonuniformity or the deviations from a symmetry which the waveguide inherently possesses may be generated, and reproduced for a further waveguide, merely with the aid of the predetermined rule. The predetermined rule therefore contains in particular the detailed information for describing and/or for constructing the waveguide in its structure formed by the multiplicity of structural elements, in particular cross-sectional regions.

The structure of the waveguide, defined by the cross-sectional regions of the structural elements in cross section, may be invariant along the transport direction or else similar in the mathematical sense. In this case, the waveguide may have regions along the transport direction whose cross section varies, for example changes continuously from the proximal end to the distal end or in at least one zone between them, or continuously in at least one segment with a length L. Preferably, the length L is in this case at least as long as the greatest extent or difference of the cross-sectional change, or corresponds at least to the greatest extent of the larger input cross section.

In the event that the waveguide is similar in the mathematical sense along the transport direction, this may or may not be associated with a change of the cross-sectional shape. The corresponding location of a structural element or the structural elements at the ends may also change in such a way that they are twisted relative to one another, which may for example be carried out by twisting or entwining the waveguide during production and/or by thermal after-treatment while applying a rotational force or a correspondingly directed force. A combination of cross-sectional change and twisting is also conceivable.

The rule of the unique establishment, in particular of the arrangement of the cross-sectional regions, of the geometries of the cross-sectional regions and/or of the refractive indices of the structural elements, may comprise indicating a characteristic quantity for each of the structural elements according to a deterministic specification, in particular for the definition of the position of the cross-sectional region, of the area of the cross-sectional region or of the refractive index of the respective structural element.

In other words, the predetermined rule is preferably a deterministic rule which defines characteristic quantities for the structural elements uniquely and independently of chance, in order to describe the construction of the waveguide with its structural elements.

The rule of the unique establishment, in particular the deterministic specification for indicating the characteristic quantities, preferably comprises a series, in particular a mathematical series, of fixed values. The series of values may be configured as a low discrepancy series and/or as a deterministic series, for example as a Halton series, as a Sobol series, as a Niederreiter series, as a Hammersley series, as a Faure series or as a combination, concatenation or succession of a plurality of series. For example, a part of a first series and a part of another series may also be provided in a defined way in order to indicate the characteristic quantities.

The rule of the unique establishment, in particular the deterministic specification for indicating the characteristic quantities, preferably comprises picking a particular value, in particular a determinable uniquely preset value, of a deterministic series in order to indicate a characteristic quantity for a particular structural element, picking a further value of the deterministic series in order to indicate a characteristic quantity for a further structural element, checking whether the value or the characteristic quantity for the further structural element, especially with regard to the value or the characteristic quantity for the particular structural element, violates a defined condition, and if the defined condition is violated, discarding the further value and picking yet another value of the deterministic series in order to indicate a characteristic quantity for the further structural element, or modifying the further value in a predefined way such that the defined condition is satisfied or no longer violated. The defined condition may in this case be configured as a fixed minimum difference of the values or characteristic quantities, in particular as a fixed minimum distance between positions of the cross-sectional areas of the structural elements. In this context, reference is made to an exemplary description further below.

In a preferred configuration of the waveguide, the distribution of the area contents of the Voronoi cells with respect to the positions, in particular with respect to the midpoints, of the cross-sectional areas of the structural elements of at least one type fulfills at least one of the following conditions, which may in particular be configured as homogeneity criteria for the image sharpness in the case of an image guide.

The variance $V_d$ of the distribution is less than the variance $V_z$ of a corresponding distribution for random positions of the cross-sectional areas, the ratio $V_z/V_d$ preferably lying between 1 and 10, in particular being greater than 1, preferably being greater than 2, most preferably being greater than 2.5, and/or being less than 8, preferably being less than 7, most preferably being less than 6.5. The ratio $V_z/V_d$ may particularly preferably lie in a range of between 1 and 8, in particular in a range of between 2 and 7, particularly in a range of between 2.5 and 6.5. Variance in the context of this application is intended in particular to mean a variance normalized to the cross-sectional area A of the waveguide, such that $V=\sigma/A^2$, where σ denotes the variance of the distribution of the area contents of the Voronoi cells with respect to the positions of the cross-sectional areas of the structural elements inside an area A.

The variance $V_d$ of the distribution is less than $0.38/N^{2.033}$, where N denotes the number of structural elements of the at least one type, in which case the variance is again intended in particular to be understood as a normalized variance.

The variance $V_d$ of the distribution is greater than the variance of a corresponding distribution for periodic positions of the cross-sectional areas, the variance $V_d/A^2$ preferably being greater than 0, in particular being greater than $10^{-10}$, preferably being greater than $10^{-9}$, most preferably being greater than $10^{-8}$, in which case the variance is again intended in particular to be understood as a normalized variance.

The magnitude of the skewness $S_d$ of the distribution is less than the magnitude of the skewness $S_z$ of a corresponding distribution for random positions of the cross-sectional areas, the magnitude of the skewness $S_d$ lying in the range of between 0 and 1.5, in particular being greater than 0.01, preferably being greater than 0.05, most preferably being greater than 0.1, and/or being less than 1.4, preferably being less than 1.2, most preferably being less than 0.8. Alternatively or in addition, the ratio of the magnitudes $S_z/S_d$ may also lie between 1 and 50, in particular be greater than 1.1, preferably be greater than 1.3, most preferably greater than 1.9, and/or less than 25, preferably less than 15, most preferably less than 10.

The kurtosis $W_d$ of the distribution is less than the kurtosis $W_z$ of a corresponding distribution for random positions of the cross-sectional areas, the kurtosis $W_d$ lying between 0 and 10, in particular being greater than 0.5, preferably being greater than 1, most preferably being greater than 2, and/or being less than 10, preferably being less than 6, most preferably being less than 5. Alternatively or in addition, the ratio $W_z/W_d$ may also lie between 1 and 5, in particular be greater than 1.1, preferably greater than 1.5, most preferably greater than 2, and/or be less than 4.5, preferably less than 4, most preferably less than 3.

The ratio of the total area of the cross-sectional regions of the structural elements of the first type and the total area of the cross-sectional regions of the structural elements of the second type lies for example in a range of between 1:9 and 9:1, preferably in a range of between 3:7 and 7:3, particularly preferably in a range of between 4:6 and 6:4, also in particular 5:5. This may also be understood as a fill ratio.

Particularly in the event that a multiplicity of structural elements in the form of filamentary channels are provided, the ratio of the total area of the cross-sectional regions of the structural elements of the first type and the total area of the cross-sectional regions of the structural elements of the second type may also lie in a range of between 1:150 and 150:1, preferably in a range of between 1:100 and 100:1, particularly preferably in a range of between 1:50 and 50:1.

The total area of the cross-sectional regions of the structural elements for each type is for example at least 1/(10*T), preferably at least 1/(5*T), particularly preferably at least 1/(3*T) of the cross-sectional area, where T denotes the number of types of structural elements.

The first refractive index of the structural elements of the first type and the second refractive index of the structural elements of the second type may for example differ by at least $10^{-4}$, in particular differ by at least $10^{-3}$, in particular differ by at least $10^{-2}$, in particular differ by at least $10^{-1}$, in particular differ by at least 1, in particular differ by at least 2, in particular differ by at least 3, in particular differ by at least 4.

In respect of the lateral extent of the structural elements, provision may be made that at least one cross-sectional region has a diameter of from 100 nm to 50 μm, preferably from 400 nm to 20 μm, particularly preferably from 1 μm to 16 μm.

Furthermore, provision may be made that at least one cross-sectional region has a diameter which lies between 0.1 times and 10 times the average wavelength, in particular of a wavelength range of electromagnetic waves preferably to be transmitted, lies preferably between 0.2 times and 5 times the average wavelength, lies particularly preferably between 0.5 times and 2 times the average wavelength.

In respect of the geometrical shape of the structural elements, provision may be made that a cross-sectional region has a non-round or polygonal, for example pentagonal or hexagonal, geometry.

As already described, the waveguide comprises a multiplicity of structural elements, at least two different types of structural elements being included. In one embodiment of the waveguide, provision may then be made that a structural element of the first type and a multiplicity of structural elements of the second type are included. The multiplicity of structural elements accordingly comprises in particular precisely one structural element of the first type.

The structural element of the first type is in particular configured as a base body, for example a monolithic base body, comprising or consisting of a first medium, the first medium having the first refractive index. The structural elements of the second type may be configured as cavities in the base body, the cavities preferably forming the second refractive index, for example by the refractive index of air or a gas which may be located as a medium in the cavities.

The cavities in the base body may be configured as filamentary channels, that is to say channels which for example have a significantly smaller area in relation to the cross-sectional area of the waveguide, which may in particular be introduced into the base body by a laser beam of an ultrashort-pulse laser. Furthermore, the filamentary channels in the base body may be finished, in particular chemically or physically by etching processes, for example in order to smooth the contours of the filamentary channels.

Particularly in the event that the waveguide is configured as a base body with cavities, but also independently thereof, the waveguide may preferably have a greater extent in cross section than along the transport direction. In particular, the waveguide may be configured as a faceplate.

Provision may be made that the waveguide has an area of at least 4 square millimeters in cross section, preferably at least 2500 square millimeters, particularly preferably at least 10 000 square millimeters.

The waveguide may for example have an extent in cross section which is at least 2 times greater than the extent along the transport direction, preferably is at least 5 times greater than the extent along the transport direction, particularly preferably is at least 10 times greater than the extent along the transport direction.

A base body with cavities may be producible or produced in various ways. On the one hand, the cavities in the base body may be formed by additive construction of the base body, for example by means of 3D printing methods. Alternatively or in addition, cavities may be introduced subtractively into the base body, in particular as bores, which are introduced into the base body in particular by abrasive material processing methods, for example mechanical boring. Depending on the method used, bores are not exclusively limited to round geometries.

Preferably, the waveguide is produced by a multi-drawing method, particularly in such a way that the waveguide comprises at least one second multiplicity of structural elements in addition to the multiplicity of structural elements, the waveguide having at least two area zones in cross section, which respectively include the cross-sectional regions of one of the two multiplicities of structural elements and, apart from a rotation and/or a reflection, these have an identical structure.

In respect of the size of the waveguide along the transport direction, provision may be made that the waveguide has an extent of less than 10 millimeters along the transport direction, preferably less than 6 millimeters, particularly preferably less than 5 millimeters, particularly if the waveguide is configured as a faceplate.

In general, however, provision may also be made that the waveguide has an extent along the transport direction of at least 10 millimeters, preferably at least 20 millimeters, particularly preferably at least 50 millimeters, even more preferably at least 100 millimeters.

In the event that the waveguide is configured as a base body with cavities, the cavities in the base body, in particular the filamentary channels and/or the bores, may be filled with a second medium, the second medium having the second refractive index.

In respect of the materials, provision may be made that at least one structural element, in particular the or a structural element of the first type, in particular the structural element configured as a base body, comprises or consists of one or more of the following materials as a medium: glass, quartz glass, polymer, crystals, single crystals, polycrystalline materials and/or glass ceramic.

Furthermore, at least one structural element, in particular the or a structural element of the first type, in particular the structural element configured as a base body, may comprise or consist of a material as a medium which has an attenuation of less than 100 dB/m, in particular less than 50 dB/m, in particular less than 10 dB/m, in particular less than 1 dB/m, in the wavelength range, to be transmitted, in particular of from 2 μm to 20 μm, in particular an infrared-transmissive material, in particular a chalcogenide, in particular comprising at least one element from the group oxygen, sulfur, selenium and tellurium, as well as at least one element from the group arsenic, germanium, phosphorus, antimony, lead, boron, aluminum, gallium, indium, titanium, sodium.

Optical active materials may furthermore be provided, for example as part of a medium or of a filler and/or also as a layer or coating or as another modification to or on the surfaces of an assembly of structural elements configured as rods or tubes. In this way, for example, a modification of the guided electromagnetic waves may be achieved, for example in the sense of amplification or conversion.

A further structural element, in particular the or a structural element of the second type, preferably comprises or consists of a different one of the aforementioned materials. In other words, a structural element, in particular the or a structural element of the second type, that is to say also in particular the cavities in the base body which are filled with a second medium, may likewise comprise or consist of one or more of the aforementioned materials as a medium, in particular those materials which the aforementioned structural element, that is to say in particular the structural element of the first type, does not comprise.

As already described, the waveguide comprises a multiplicity of structural elements, at least two different types of structural elements being included, in which case, as already described, a structural element of the first type and many structural elements of the second type may for example be included.

In another embodiment, it is then provided that a multiplicity of structural elements of the first type and a multiplicity of structural elements of the second type are included.

In this case, the structural elements of the first type may be configured as bodies, in particular rod-shaped or tubular bodies, comprising or consisting of a first medium, the first medium having the first refractive index.

In this case, the structural elements of the second type may be configured as bodies, in particular rod-shaped or tubular bodies, comprising or consisting of a second medium, the second medium having the second refractive index, and/or as cavities in the structural elements of the first type, the cavities preferably forming the second refractive index or being filled with a second medium which has the second refractive index.

Particularly in the event that the structural elements of the second type are present as filled cavities in the structural elements of the first type, the structural elements may be configured as core-cladding systems, in such a way that the core corresponds to the filled cavity.

In this case, rod-shaped or tubular bodies are not to be understood exclusively as ones having a round cross-sectional geometry.

The invention furthermore relates to a waveguide, in particular having one or more of the features described above, for transmitting electromagnetic waves, in particular for transmitting image information, from a proximal end of the waveguide to a distal end of the waveguide, along a transport direction running between the proximal end and the distal end, and over a cross section running transversely with respect to the transport direction, wherein the waveguide comprises a multiplicity of structural elements, at least two different types of structural elements being included, namely a first type having a first refractive index and a second type having a second refractive index, wherein the structural elements respectively extend along the transport direction and partly over the cross section of the waveguide, in such a way that a multiplicity of cross-sectional regions are defined in the cross section of the waveguide, each of which correspond to the cross section of an individual structural element, and wherein the waveguide has a greater extent in cross section than along the transport direction.

The invention furthermore relates to a waveguide, in particular having one or more of the features described above, for transmitting electromagnetic waves, in particular for transmitting image information, from a proximal end of the waveguide to a distal end of the waveguide, along a transport direction running between the proximal end and the distal end, and over a cross section running transversely with respect to the transport direction, wherein the waveguide comprises a multiplicity of structural elements, at least two different types of structural elements being included, namely a first type having a first refractive index and a second type having a second refractive index, wherein the structural elements respectively extend along the transport direction and partly over the cross section of the waveguide, in such a way that a multiplicity of cross-sectional regions are defined in the cross section of the waveguide, each of which correspond to the cross section of an individual structural element, and wherein at least one of the structural elements has an attenuation of less than 100 dB/m, in particular less than 50 dB/m, in particular less than 10 dB/m, in particular less than 1 dB/m, in the wavelength range of from 2 μm to 20 μm, in particular comprises or consists of an infrared-transmissive material.

Depending on the extent of the waveguide in the transport direction, the following attenuations may also be provided. In the case of a waveguide having an extent of at least 5 millimeters in the transport direction, an attenuation of at most 100 dB/m may be provided. In the case of a waveguide having an extent of at least 10 centimeters in the transport direction, an attenuation of at most 50 dB/m may be provided. In the case of a waveguide having an extent of at least 1 meter in the transport direction, an attenuation of at most 30 dB/m may be provided.

The invention furthermore relates to a method for producing a waveguide, in particular a waveguide having one or more of the features described above, comprising providing a structural element of a first type having a first refractive index, in the configuration of a base body, in particular a monolithic base body, comprising or consisting of a first medium, and introducing a multiplicity of structural elements of a second type having a second refractive index, wherein for this purpose cavities are introduced into the base body and are preferably filled with a second medium.

The structural elements of the second type are introduced here in such a way that they respectively extend partially over the cross section of the waveguide, so that a multiplicity of cross-sectional regions which respectively correspond to the cross section of an individual structural element of the second type are defined in the cross section of the waveguide.

According to the invention, the structural elements of the second type are furthermore introduced in such a way that the cross-sectional regions of the structural elements of the second type have an arrangement which is nonuniform, in particular aperiodic, but uniquely established by a predetermined rule, and/or have geometries, for example diameters, which are nonuniform but uniquely established by a predetermined rule.

In the method for producing a waveguide, provision may be made that the rule of the unique establishment, in particular of the arrangement and/or of the geometries of the cross-sectional regions, comprises that a characteristic quantity is indicated for each of the structural elements of the second type according to a deterministic specification, in particular for the definition of the position and/or the area of the cross-sectional region of the respective structural element.

The rule of the unique establishment, in particular the deterministic specification for indicating the characteristic quantities, may in particular comprise the use of a series, in particular a mathematical series, of fixed values. Furthermore, reference is made to the series indicated above. Furthermore, reference is made to the steps of picking, checking and optionally discarding/modifying values which are specified in detail above.

Preferably, the distribution of the area contents of the Voronoi cells with respect to the positions, in particular with respect to the midpoints, of the cross-sectional areas of the structural elements of at least one type fulfills at least one of the conditions mentioned above, in particular (i), (ii), (iii), (iv), (v).

In the method for producing a waveguide, the cavities may be introduced into the base body as filamentary channels, in particular by a laser beam, for example, of an ultrashort-pulse laser. Furthermore, the filamentary channels in the base body may be finished, in particular chemically and/or physically by etching processes, for example in order to smooth the contours of the filamentary channels, in particular before the filamentary channels are filled with a second medium.

The cavities may be introduced into the base body with a distance from one another which is greater than the diameter of the cavities, preferably two times greater than the diameter of the cavities, particularly preferably three times greater than the diameter of the cavities.

The cavities may also be produced by additive construction of the base body and/or introduced subtractively into the base body, in particular by abrasive machine processing methods, for example mechanical boring.

In respect of the materials, provision may be made that the base body comprises or consists of one or more of the materials mentioned above as a medium. Furthermore, at least one structural element of the second type may comprise or consist of one or more of the materials mentioned for the base body of the first type as a medium, in particular those which the base body does not comprise.

The invention furthermore relates to a method for producing a waveguide, in particular having one or more of the method steps mentioned above, which may preferably be referred to as a drawing method or multi-drawing method.

In this method, a waveguide having one or more of the features mentioned above is assembled with one or more further waveguides, each likewise having one or more of the features mentioned above, in such a way that the waveguides have transport directions running parallel to one another, in order to form a preform.

The assembled waveguides are then drawn lengthwise together along the transport direction. In this case, in particular, a drawing factor of at least 1:2, preferably at least 1:10, particularly preferably at least 1:100, is envisioned.

Preferably, the assembled waveguides drawn lengthwise can then be divided into portions transversely with respect to the transport direction, and the portions can be in turn assembled with transport directions running parallel to one another in order again to form a preform.

The assembled portions can then be in turn drawn lengthwise together along the transport direction. In this case, in particular, a drawing factor of at least 1:2, preferably at least 1:10, particularly preferably at least 1:100, is again envisioned.

The waveguides and/or the portions may respectively be assembled, in order to form a preform, in such a way that the arrangement of the assembly is uniquely established by a predetermined rule, in particular according to the details explained in more detail above.

The waveguides and/or the portions may furthermore respectively be assembled, in order to form a preform, in such a way that the structure formed by the cross-sectional zones of the second structural elements in cross section are rotated with respect to one another, particularly in a predefined way, in particular untwisted with respect to one another. Furthermore, the waveguides and/or the portions may be turned lengthwise during the assembly, so that a reflection of the cross section takes place.

In this case, portions that are produced from at least one further preform may also be assembled. These preforms are preferably assembled according to a common determined rule and are substantially identical, although they may also follow different determining rules.

In addition, the waveguides and/or the portions may respectively be assembled in an automated fashion, in particular with robot assistance.

Furthermore, the assembled waveguides drawn lengthwise and/or the assembled portions drawn lengthwise may be fused by applying heat and/or pressure, and particularly in a vacuum.

The invention furthermore relates to a method for producing a waveguide, wherein two or more waveguides, which are configured identically, are produced in such a way that the cross-sectional regions of the structural elements of the second type respectively have the same arrangement, which is nonuniform but uniquely established by a predetermined rule, and/or have the same geometries, for example diameters, which are nonuniform but uniquely established by a predetermined rule.

The method is, in particular, configured as a method for producing a plurality of identical waveguides, the plurality of waveguides preferably being produced independently of one another. In particular, further waveguides with the same structure may accordingly be produced merely with the aid of the predefined rule.

Apart from the fact that a plurality of identical waveguides may be produced by the method, the method is also suitable for producing a plurality of waveguides which correspond to one another at least in respect of particular properties. For example, the plurality of waveguides may fulfill a defined homogeneity criterion for the image sharpness and/or fulfill one or more of the conditions described above, which relate to the distribution of the area contents of the Voronoi cells with respect to the positions, in particular with respect to the midpoints, of the cross-sectional areas of the structural elements of at least one type.

The invention furthermore relates to a waveguide, in particular having one or more of the features mentioned above for the waveguide, which is produced or producible by a method having one or more of the method steps described above.

Lastly, the invention also relates to a kit having two or more waveguides, each in particular having one or more of the features mentioned above for the waveguide, in particular produced or producible by a method having one or more of the method steps described above, wherein the waveguides respectively comprise a multiplicity of structural elements, wherein the structural elements, in particular the cross-sectional regions thereof, are configured nonuniformly but in a way which is uniquely established by a predetermined rule, and wherein the two or more waveguides are configured identically so that the structural elements, in particular the cross-sectional regions thereof, are configured nonuniformly in the same way.

BRIEF DESCRIPTION OF DRAWINGS

Preferred exemplary embodiments of the invention will be described below with reference to the figures, in which:

FIG. 8*a* shows an example of Voronoi cells with respect to the positions of the cross-sectional areas of the structural elements of a second type positioned inside a structural element of a first type, which has a square cross section, FIG. 8*b* shows an example of positioning according to a Sobol series, FIG. 8*c* shows an example of random positioning, FIG. 8*d* shows an example of periodically positioning as further comparative examples.

DETAILED DESCRIPTION

Figures 1A, 1B, 1C, 1D, 1E:
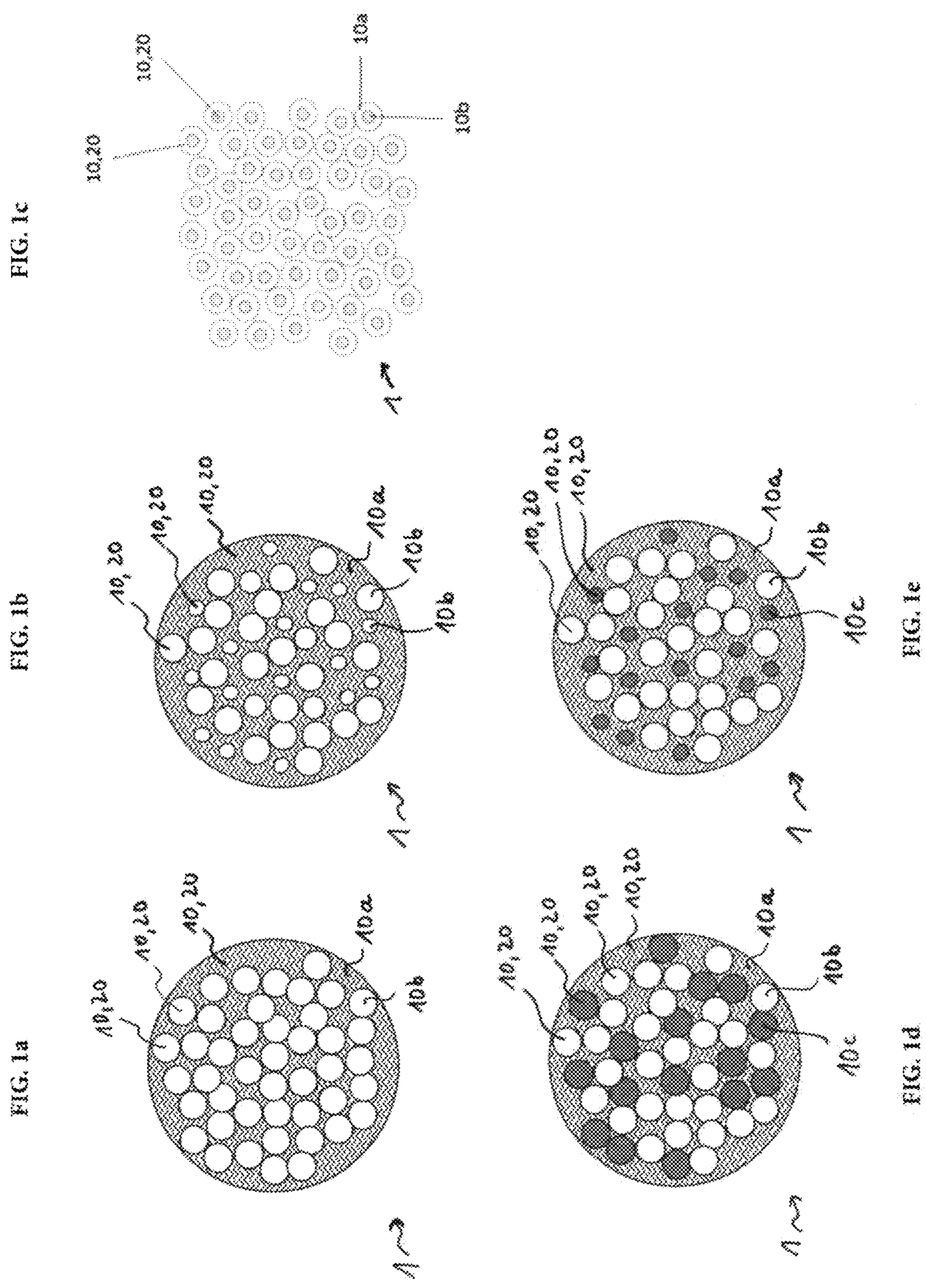
FIGS. 1*a-c* show schematic representations of cross sections of various waveguides with two types of structural elements.
FIGS. 1*d-e* show schematic representations of cross sections of various waveguides with three types of structural elements, the cross-sectional zones of the structural elements being arranged nonuniformly.

FIGS. 1*a*-1*e* show various outline examples of waveguides 1, which may be usable in particular as image guides. The waveguides 1 represented in cross section respectively comprise a multiplicity of structural elements 10, each of which extend along the transport direction of the waveguide 1, here running perpendicularly to the drawing, and respectively in part over its cross section. Each of the structural elements 10 therefore defines a cross-sectional region 20, that is to say an area fraction of the cross section of the waveguide 1. The examples shown of waveguides 1 respectively have at least two different types of structural elements, which differ in their refractive indices. These outline representations serve to illustrate some variants of the nonuniformity and may differ in detail from a particular deterministic positioning according to the invention of structural elements.

The waveguide shown in cross section in FIG. 1*a* comprises a structural element of a first type 10*a*, which is configured as a base body and contains a multiplicity of structural elements of a second type 10*b*. The structural elements of the second type 10*b* may in this case, for example, be configured as cavities, or hollow channels, running along the transport direction in the structural element of the first type 10*a*. The structural element of the first type 10*a*, configured as a base body, in this case comprises a first material with a first refractive index and the structural elements of the second type 10*b*, configured for example as cavities, form the second refractive index, for example by the air or another gas contained therein. The cross-sectional region 20 of the structural element of the first type 10*a* corresponds in this case to the cross-sectional area of the waveguide less the holes defined by the cavities in this area, while the cross-sectional regions 20 of the structural elements of the second type 10*b* respectively correspond to the cross-sectional area of the cavities. The cavities in the base body may however also be filled with a second material, in such a way that the structural elements of the second type 10*b* correspond to the filled cavities. As is schematically represented in the figure, the cross-sectional regions 20 of the structural elements of the second type 10*b* are configured nonuniformly insofar as their positions are distributed nonuniformly over the cross section, in particular do not lie on a periodic grid. At the same time, however, the positions of the structural elements are uniquely established by a predetermined rule, as will be explained in more detail further below.

The waveguide shown in cross section in FIG. 1*b* likewise comprises two types 10*a*, 10*b* of structural elements, namely again precisely one structural element 10*a* configured as a base body with a first refractive index, and a multiplicity of structural elements 10*b* with a second refractive index different thereto. In the example shown here, the cross-sectional regions 20 of the structural elements of the second type 10*b* are not only arranged nonuniformly but also have nonuniform geometries, in this case nonuniform diameters, there being a limited number of different diameters in this case, namely two. The nonuniformity of the arrangement and/or the nonuniformity of the geometries is in this case uniquely established by a predetermined rule.

The waveguide shown in cross section in FIG. 1*c* again comprises two types 10*a*, 10*b* of structural elements, the cross-sectional regions of the structural elements of the second type 10*b* respectively being arranged inside a structural element of the first type 10*a*, in particular as core-cladding systems. In this case, a multiplicity of structural elements of the first type 10*a* and a multiplicity of structural elements of the second type 10*b* are thus provided. The structural elements, or the cross-sectional regions thereof, are configured nonuniformly insofar as the structural elements of the first type 10*a* (which contain the structural elements of the second type 10$b$) are arranged nonuniformly, in particular aperiodically, over the cross section of the waveguide, this arrangement being established by a predetermined rule.

The waveguides shown in cross section in FIGS. 1$d$ and 1$e$ correspond in some aspects to the waveguides shown in FIGS. 1$a$ and 1$b$, respectively, but comprise structural elements of three types 10$a$, 10$b$, 10$c$ with different refractive indices. In particular, cavities in the structural element 10$a$ configured as a base body may be filled with different media. The structural elements 10$b$, 10$c$ accordingly have, in particular, a nonuniform insofar as their refractive index differs from one another, the establishment of which of the structural elements configured as a cavity obtains which refractive index preferably following a predetermined rule.

Figure 2B:
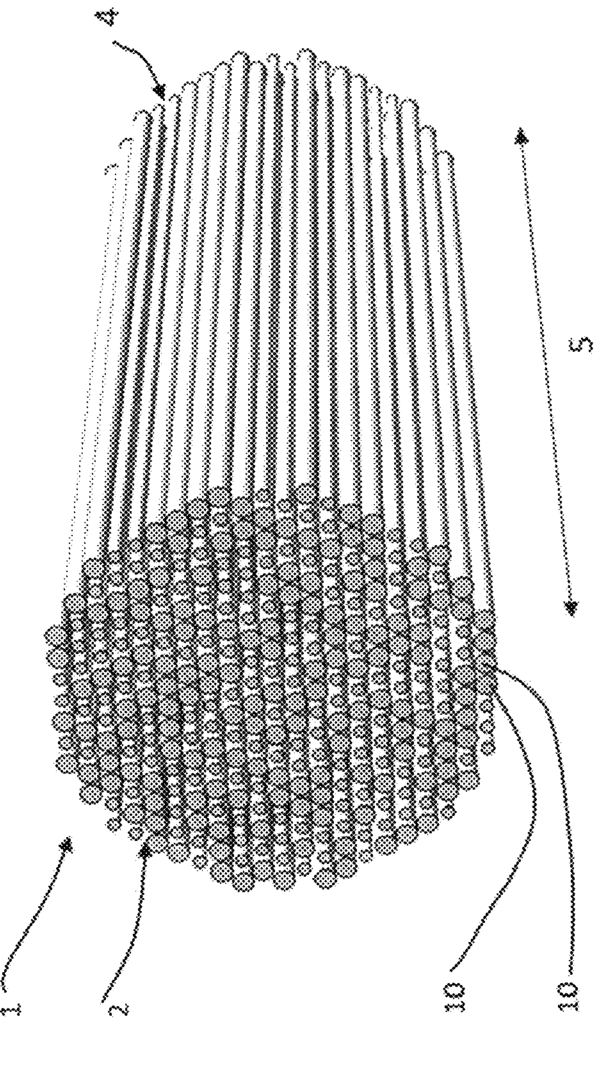
FIG. 2*b* shows a schematic perspective view of two waveguides with a multiplicity of structural elements with nonuniform refractive indices (multiplicity of types) and/or nonuniform geometries (diameters)
Figure 2A:
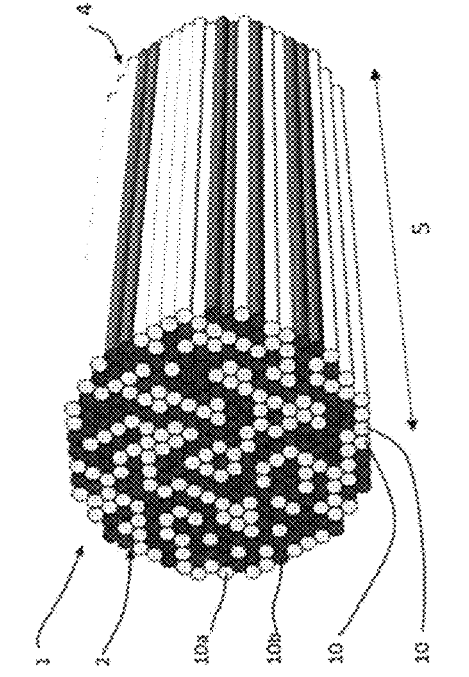
FIG. 2*a* shows a schematic perspective view of two waveguides with two types of structural elements, the cross-sectional zones of which are arranged nonuniformly distributed on a grid.

FIGS. 2$a$-2$b$ show two further examples of waveguides 1, which may in particular be usable as image guides. The waveguides 1 again comprise a multiplicity of structural elements 10, which respectively extend from a proximal end 2 to a distal end 4 of the waveguide 1 along the transport direction 5 and, for example, are configured in the shape of a rod.

The waveguide shown in FIG. 2$a$ comprises a multiplicity of structural elements of a first type 10$a$ and a multiplicity of structural elements of a second type 10$b$. In this example, the cross-sectional regions of the structural elements are arranged on a periodic grid. The structural elements have, however, a nonuniform arrangement insofar as the structural elements of the first type 10$a$ and of the second type 10$b$, and therefore the refractive indices, are arranged and/or distributed nonuniformly, the arrangement or the distribution again being uniquely established by a predetermined rule.

The waveguide shown in FIG. 2$b$ again comprises a multiplicity of structural elements 10 which are arranged on a periodic grid, the cross-sectional regions of the structural elements having nonuniform geometries in this example. The geometries may, in particular, differ by the diameters of the structural elements, or the cross-sectional regions thereof, differing from one another. Preferably, this form of nonuniformity is also uniquely established by a predetermined rule. Furthermore, the structural elements 10 may have a nonuniformly, in particular a predetermined nonuniformity, insofar as the refractive indices of the structural elements differ from one another. In this case, a discrete number of different refractive indices, for example two, three, four, etc., but also in principle a continuous variation of the refractive index may be provided.

Figure 3:
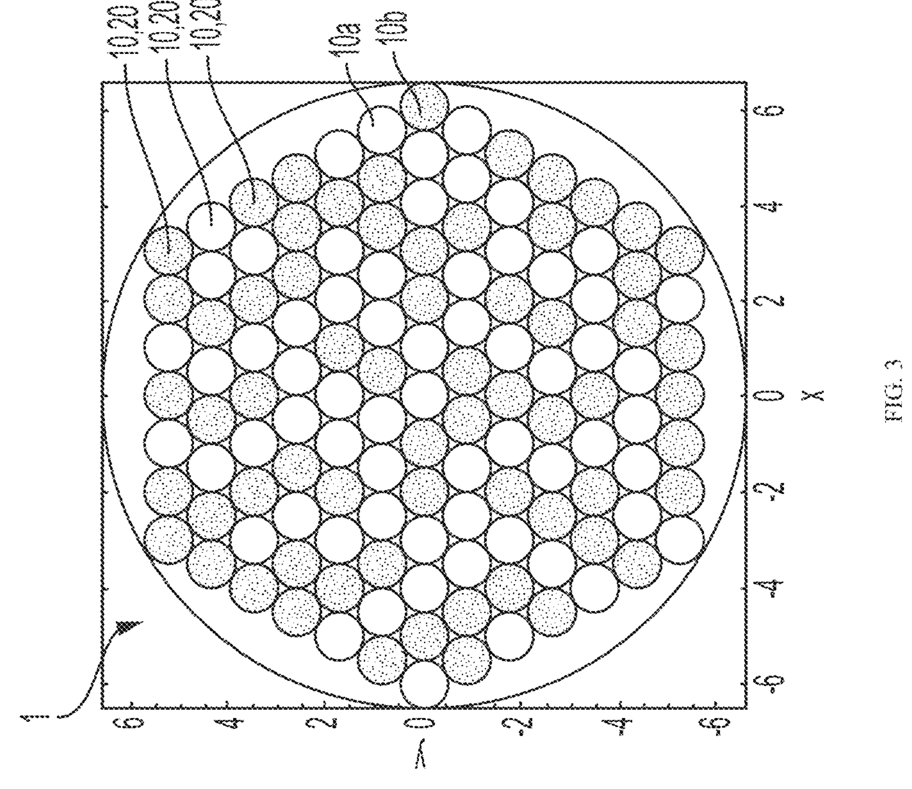
FIG. 3 shows a schematic cross section of a waveguide with two types of structural elements, the cross-sectional zones of which are arranged nonuniformly distributed on a hexagonal grid.
Figures 4A, 4B, 4C:
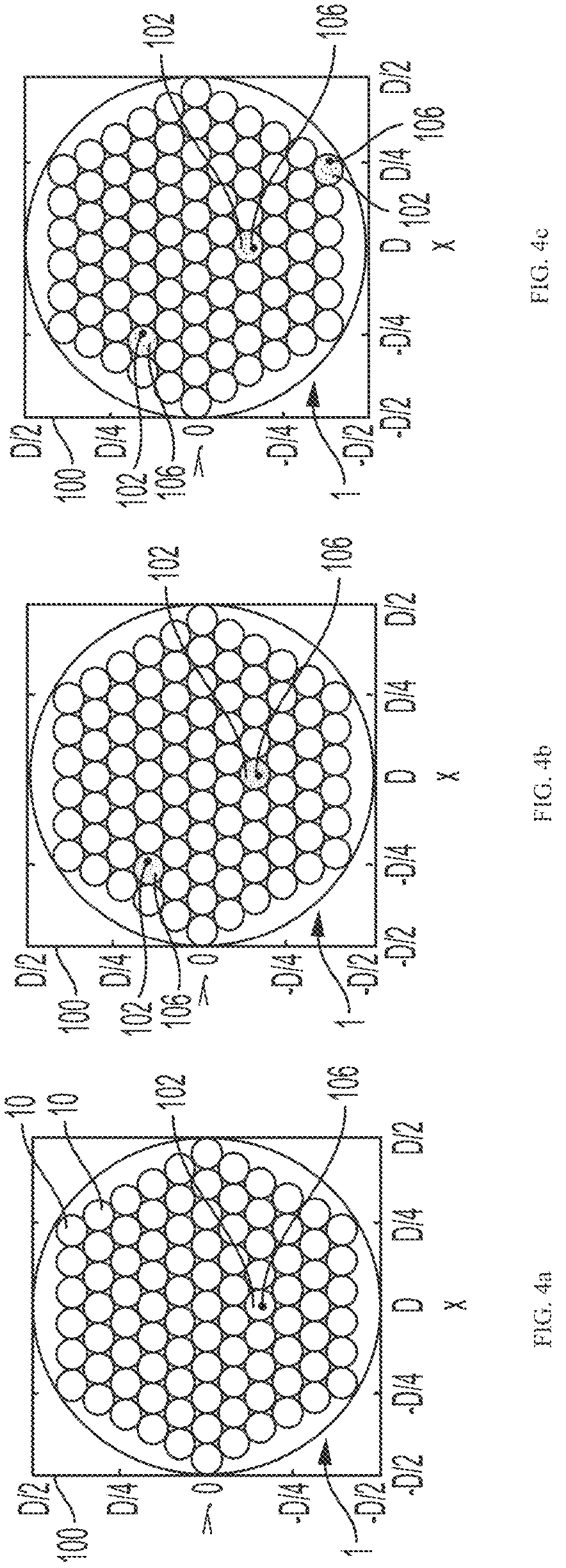
FIGS. 4*a*-4*f* shows schematic cross sections of a waveguide with two types of structural elements, the types/refractive indices of the structural elements being established according to a deterministic rule.
Figure 4F:
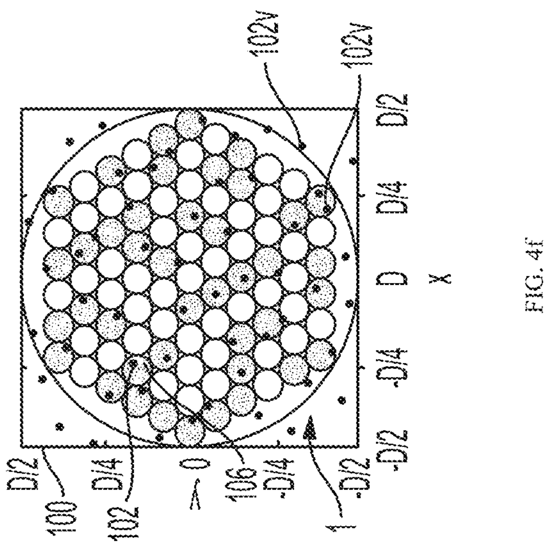
Figure 4E:
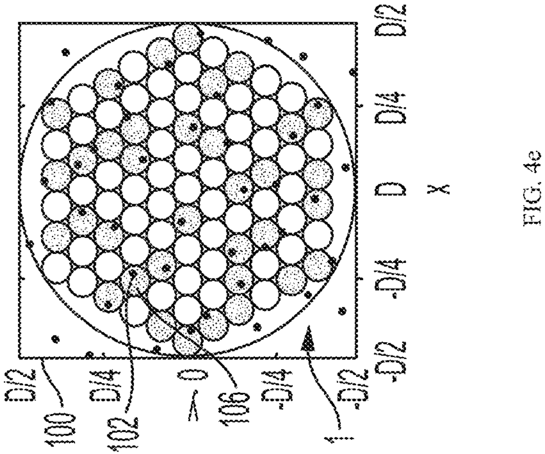
Figure 4D:
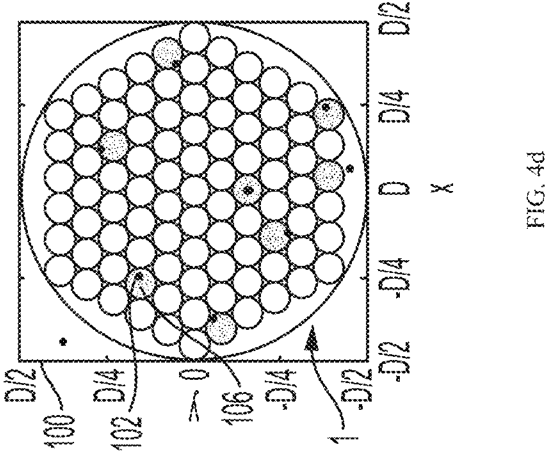

FIG. 3 shows a further cross section of a waveguide, which corresponds in some aspects to the waveguide shown in FIG. 2$a$. The waveguide shown in FIG. 3 comprises a multiplicity of structural elements 10, which are in particular rod-shaped, namely a multiplicity of a first type 10$a$ and a multiplicity of a second type 10$b$, the structural elements 10 being arranged in cross section on a periodic grid which, in this example, corresponds to a hexagonal grid. It is accordingly provided that at least one of the structural elements 10, or the cross-sectional zone 20 thereof, has an equal distance from six immediately neighboring structural elements 10, or the cross-sectional zones 20 thereof, and preferably touches them.

With reference to FIGS. 4$a$-4$f$ and 5$a$-5$b$, examples are indicated below as to how structural elements may be configured nonuniformly but in a way which is uniquely established by a predetermined rule. For this purpose, a rule for unique establishment of a characteristic, for example the position, the type, the refractive index or also the geometry, may be provided, the rule preferably comprising a deterministic series (for example a Halton series). The series forms a component of the deterministic rule, described in more detail below, for indicating the characteristic for the structural elements. For better understanding, the rule will be described in individual steps, the overall structure of the waveguide, defined by the steps, in particular being crucial, and its establishment may precede the production of a waveguide in such a way that the overall structure of the waveguide is uniquely predetermined.

For a waveguide according to the invention, for example according to preset parameters, an available area, for example the cross-sectional area of the waveguide, is filled according to a deterministic rule with structural elements at positions which may thus be determined. These parameters generally comprise the dimensions of structural elements, in particular shape and size, as well as indications for example of their location and spacing, as well as the fill factor which indicates the proportion to which the area is intended to be filled with structural elements of one or more types.

For example, structural elements 10$b$ which are occupied by a medium, for example with a second refractive index, are intended to be selected for a round shape of a waveguide 1 (compare FIG. 3), in particular for example also a preform therefor (compare FIGS. 10$a$-10$d$), with a preset arrangement and number of structural elements (here in the example equal diameters, hexagonally closest packing), for a preset fill factor according to a deterministic algorithm (for example comprising a Halton series).

For this purpose, in the square 100 circumscribing the round shape of the waveguide 1, points 102 are produced, for example, according to a 2D Halton sequence. The values of the sequence lie in the range $[0,1)\times[0,1)$ and are scaled according to the dimensioning of the preset area of the waveguide.

The Halton sequence is the multidimensional expansion of the one-dimensional van der Corput sequence to different bases: the van der Corput sequence $x_n=\phi_b(n)$ for base b is in this case defined by means of the inverse of the base b representation of a number n: each positive integer n>=0 may, for example, be represented as a sum for a base b>=2:

$$n = \sum_{k=0}^{m-1} a_k(n) b^k$$

where the coefficients $a_k(n)$ are elements of the complete residue system modulo b ($\mathbb{Z}_b=(0,1, \ldots, b-1)$), and m is the smallest integer such that $a_j(n)=0$ for all j>m. The van der Corput sequence is then defined by means of the radical inverse function for base b:

$$\phi_b(n) = \sum_{k=0}^{m-1} a_k(n) b^{-k-1}$$

where b is a prime number.

Since the structural elements 10 are localized at predefined sites and the sequences cover the entire range $[0,1)\times[0,1)$, the following allocation takes place: the sequence elements are run through in order. The allocation to a structural element, in particular to a second type 10$b$, takes place by means of the shortest Euclidean distance. Sequence elements which are thus already allocated to selected structural elements or lie outside the arrangement are ignored and the procedure continues with the next sequence element. This is continued until the number of structural elements, in particular of the second type 10*b*, corresponding to the desired fill factor has been selected.

This will be represented for illustration with the aid of two exemplary embodiments.

A first exemplary embodiment shows a waveguide, or a preform for a waveguide 1, in a round shape FIGS. 4*a*-4*f*, which is formed by at least two types of, likewise round, structural elements with two different refractive indices, which are preset in a hexagonal packing or arrangement.

This arrangement is then occupied with the two refractive indices in a way which is determined according to the specification of a deterministic series until a preset fill ratio is achieved. In this way, particular occupied structural elements then receive one refractive index and the rest receive the other.

This is done under the following conditions: the structural elements which lie closest to a sequence point 102 are occupied (for example assigned to a type 10*b*) so long as the sequence point lies inside the round shape and the associated positions, or the associated structural element, are not already occupied (for example assigned to a type 10*b*). In these cases, the sequence point is discarded and the next in the series is picked. A first point with the deterministic series is therefore determined and placed while being scaled into the shape (black point), the conditions above are checked, and in this first case the structural element highlighted in gray is occupied. A corresponding procedure is carried out with the subsequent points.

If sequence points 102 outside the shape, which is in this case round, or doubling subsequently occur, these sequence points 102 are discarded and the procedure continues with the subsequent sequence point 102 until a preset fill ratio is achieved.

The figures show points 102*v* to be discarded (kept here) outside the round shape or a double point, as well as a result for a fill ratio of 50%.

Figures 5A, 5B:
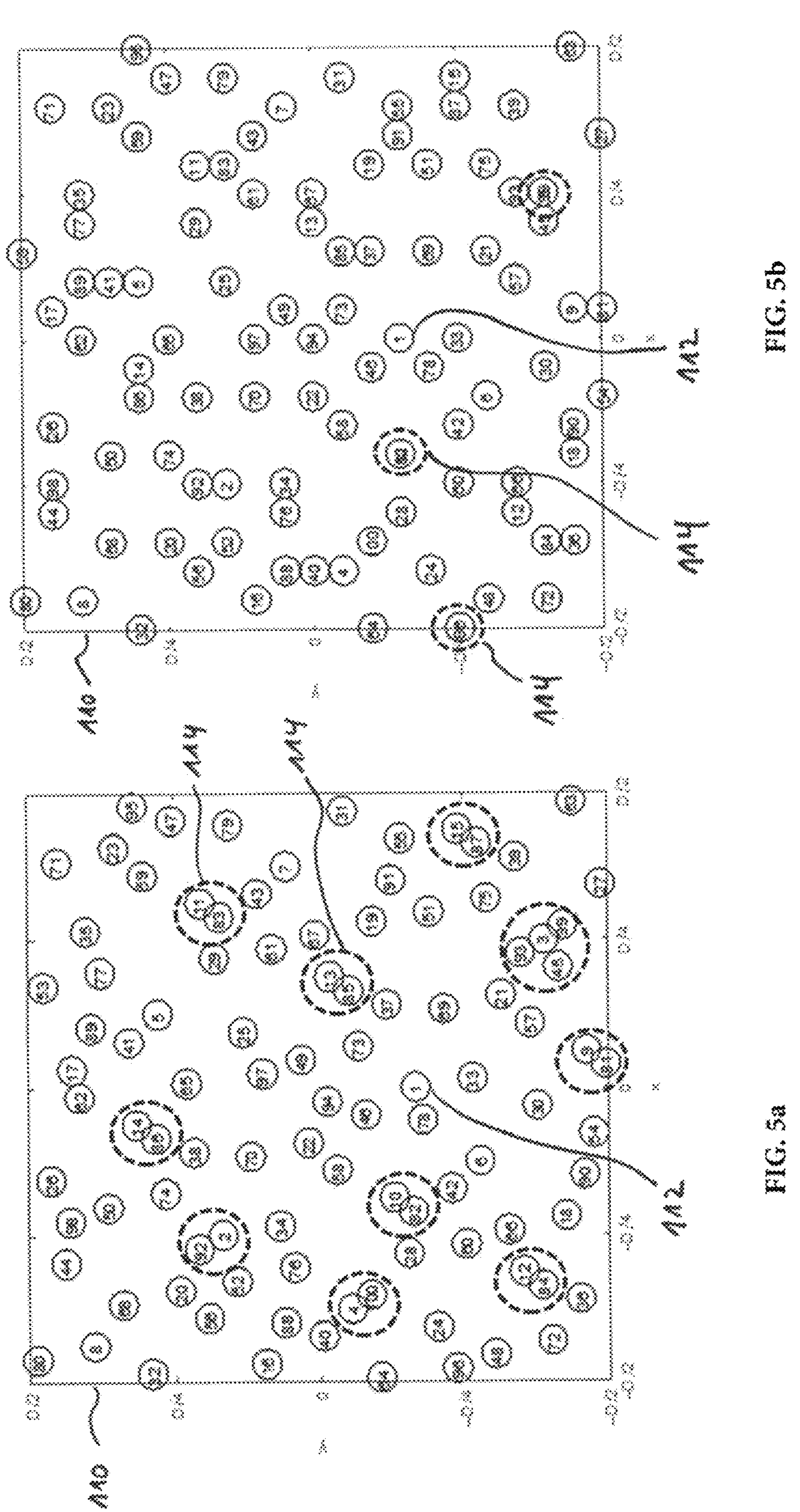
FIGS. 5*a*-5*b* shows schematic cross sections of a waveguide, for example configured as a faceplate, having a structural element of a first type as a base body and a multiplicity of structural elements of a second type as cavities in the base body, the positions of the structural elements of the second type inside the base body being established according to a deterministic rule.

A further exemplary embodiment (FIGS. 5*a*-5*b*) show the occupancy of a preset area. The aim here is, for example, to position structural elements, for example holes with a diameter, according to the Halton sequence for a laser filamentation or boring process on a square plate 110 with the edge length D. Here, the sequence points 112 from the value range [0,1) are scaled to the dimension range [−D/2, D/2) of the area preset here. This is done until a preset fill ratio is achieved. The fill ratio is given by the area ratio of the sum of the holes to the substrate area. The holes may be placed according to the sequence points (FIG. 5*a*). Alternatively, the sequence points may be rounded to the diameter of the holes (FIG. 5*b*). If it is not desired that the holes overlap (overlapping hole pairs 114), such sequence points are to be discarded. Double placements (FIG. 5*b*) are correspondingly discarded and the procedure continues further in the sequence. There may likewise be further specifications in this case, which for example define a minimum distance of the structural elements.

It is to be understood that the methods described in principle above and explained in more detail with reference to 2 examples, without restriction to further possible variations, may also be applied or are applicable for structural elements with more than two refractive indices and/or a varying or variable geometry, dimension, for example two or more diameters, and/or shape or a combination thereof to any area, optionally a predetermined area, or the structure thereof may be uniquely predetermined. The conditions for occupancy or occupiability of the available area are then to be adapted or extended accordingly case by case, in order to achieve a desired required occupancy.

Figures 6A, 6B:
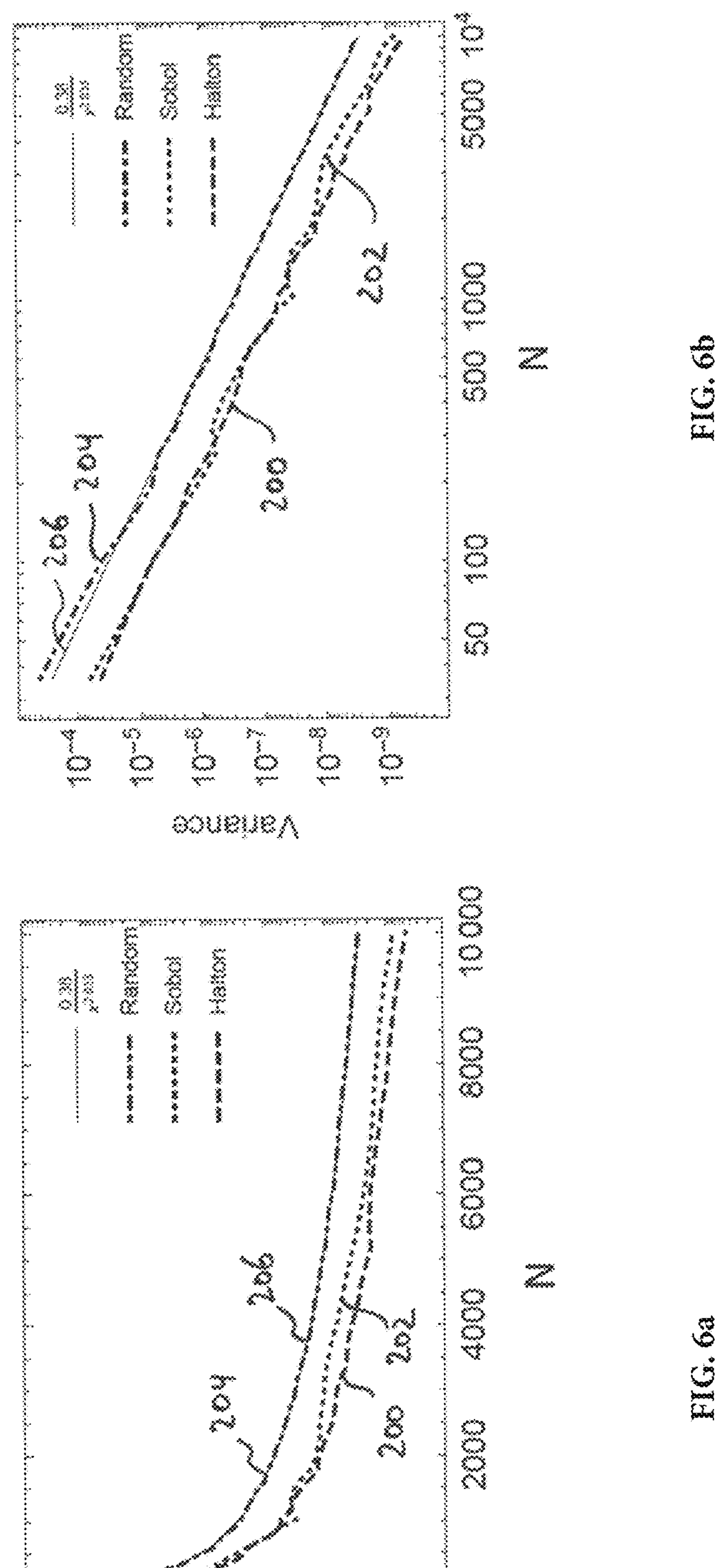
FIGS. 6*a*-6*b* shows diagrams of the variance of the distribution of the area contents of the Voronoi cells with respect to the positions of the cross-sectional areas of the structural elements of a second type positioned inside a structural element of a first type, plotted against the number of structural elements of the second type, in a logarithmic and a log-log representation, respectively.

Referring to FIGS. 6*a*-6*b*, a waveguide according to the invention fulfills in particular a determined homogeneity criterion in respect of the nonuniformity of the structural elements, and preferably in respect of the image sharpness in the case of a waveguide configured as an image guide.

For example, a distribution of area contents which correspond or are uniquely assignable to the cross-sectional areas of the structural elements may fulfill a particular condition. By way of example, variances of the distributions of the area contents of the Voronoi cells in relation to the square A of the total area of the cross section to be occupied (normalized variance $V=\sigma/A^2$) with respect to the positions of the cross-sectional areas of the structural elements of at least one type are shown plotted against the number N of structural elements of this at least one type, a logarithmic representation (FIG. 6*a*) and a log-log representation (FIG. 6*b*) being shown.

A waveguide according to the invention may be characterizable as described above by a deterministic series. Accordingly, the variance curve 200 is based on positions of the cross-sectional areas which are established by means of a Halton series, and the variance curve 202 is based on positions of the cross-sectional areas which are established by means of a Sobol series. Shown for comparison are a variance curve 204 based on randomly established positions of the cross-sectional areas and a fit curve 206 corresponding to the variance curve 204 (variance$=0.38A^2/N^{2.033}$). It may be seen that the variance of the distribution for a waveguide according to the invention (for each N) is less than the variance for a waveguide with random disorder.

It is to be noted here that the curves represented are based on distributions which extend over the value range of [0,1).

Figures 7A, 7B, 7C, 7D:
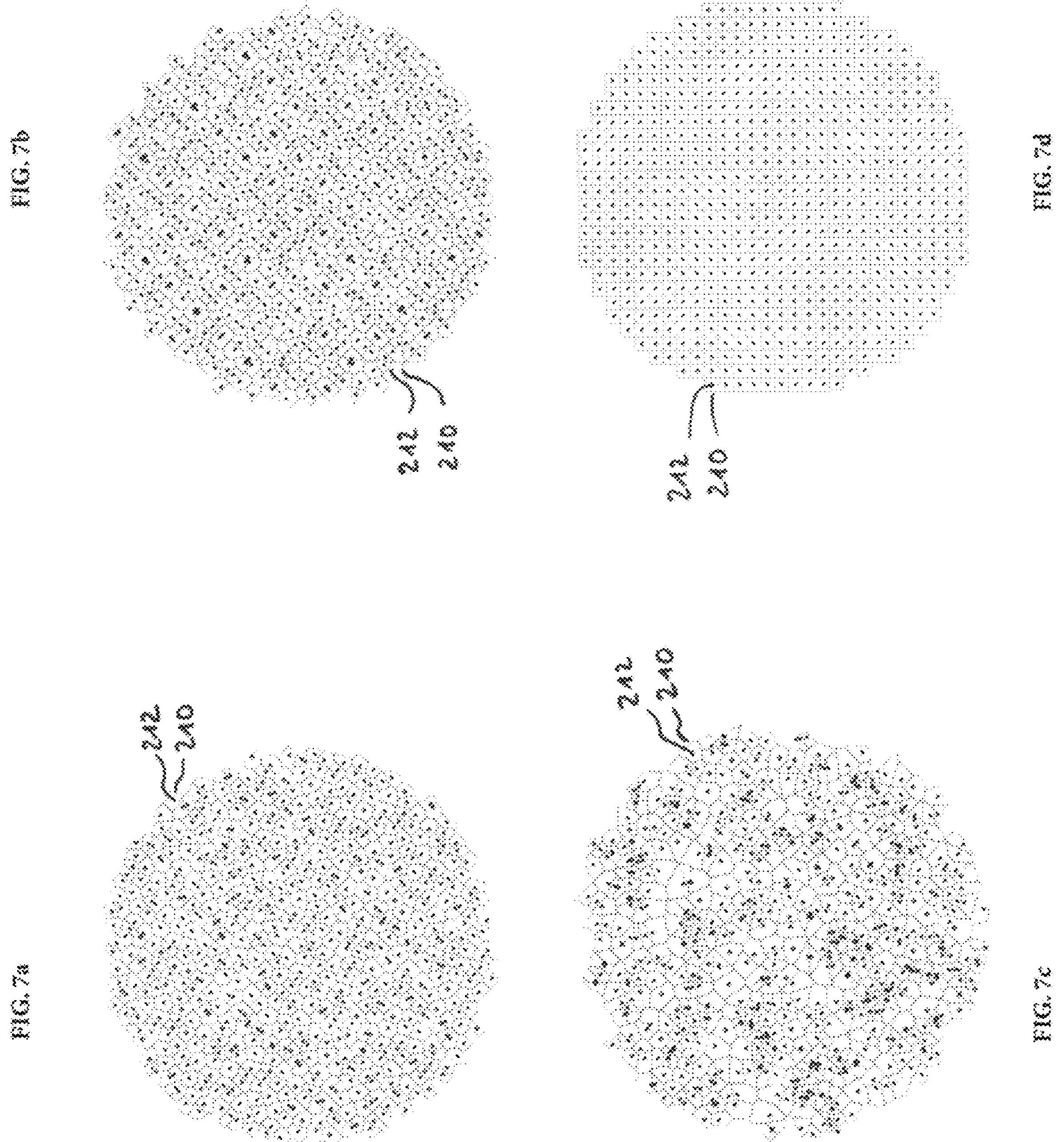
FIG. 7*a* shows an example of Voronoi cells with respect to the positions of the cross-sectional areas of the structural elements of a second type according to a Halton series positioned inside a structural element of a first type, which has a round cross section.
FIG. 7*b* shows an example of positioning according to a Sobol series.
FIG. 7*c* shows an example of random positioning.
FIG. 7*d* shows an example of periodically positioning as further comparative examples.

FIGS. 7*a*-7*d* and FIG. 8*a*-8*d* show exemplarily Voronoi cells 210 with respect to the positions 212 of the cross-sectional areas of the structural elements, for waveguides with a round cross section (FIGS. 7*a*-7*d*) and a square cross section (FIGS. 8*a*-8*d*), which is based on FIGS. 6*a*-6*b*). FIGS. 7*a*, 8*a* show positions 212 and Voronoi cells 210 based on a Halton series, and FIGS. 7*b*, 8*b* show those based on a Sobol series, which respectively correspond to the nonuniformity of a waveguide according to the invention. For comparison, FIGS. 7*c*, 8*c* show positions 212 and Voronoi cells 210 based on a random arrangement, and FIGS. 7*d*, 8*d* show those based on a periodic arrangement. It may be seen that waveguides according to the invention are characterized in that the structural elements, in particular the cross-sectional regions thereof, are configured nonuniformly but with a higher homogeneity than in the case of a random arrangement.

Figures 9A, 9B, 9C, 9D, 9E:
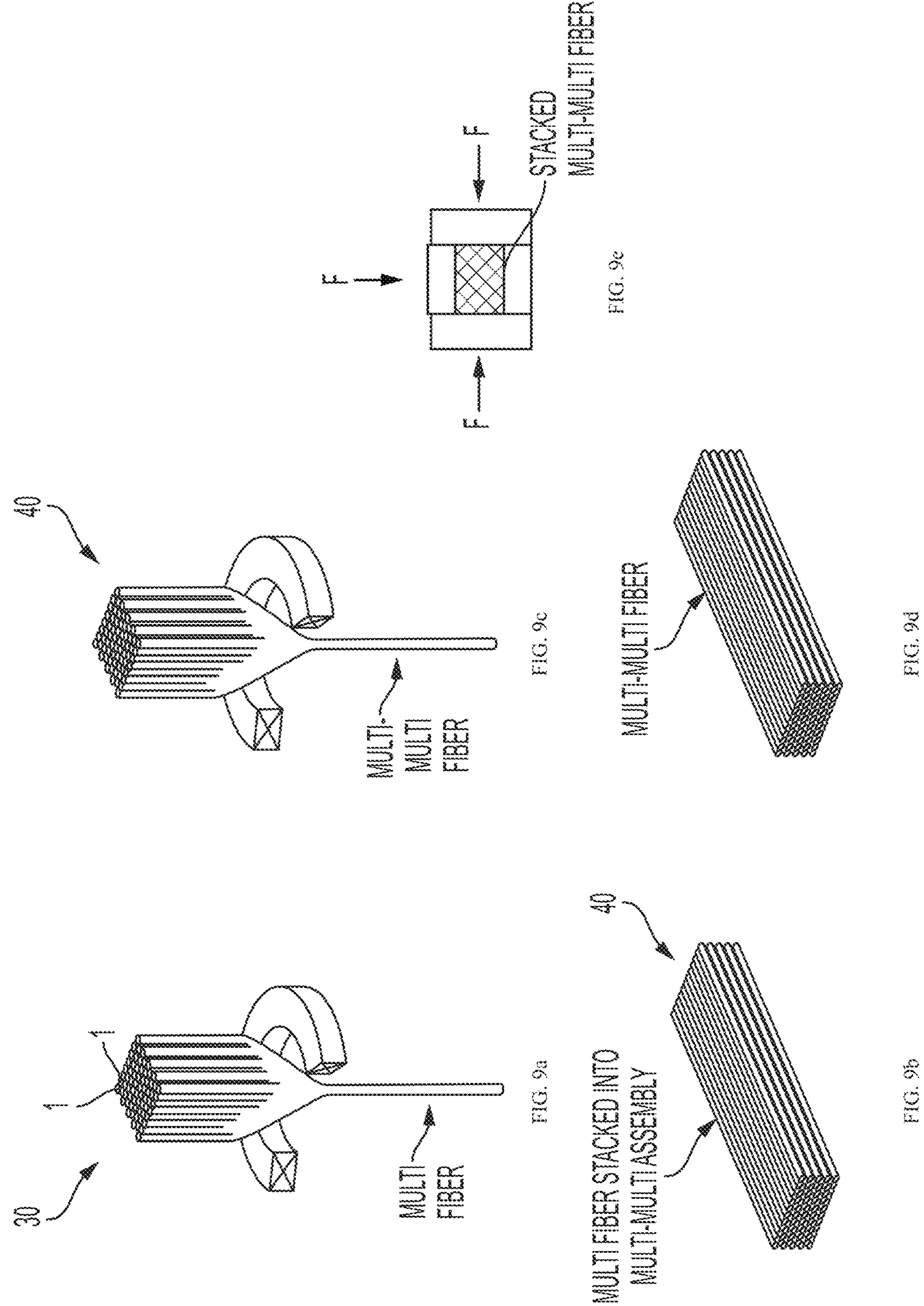
FIGS. 9*a* and 9*c* shows a schematic perspective view of waveguide preforms drawn lengthwise.
FIGS. 9*b* and 9*d* show schematic perspective views of waveguides preforms, FIG. 9*e* show waveguides fused under pressure.

FIGS. 9*a*-9*d* shows steps of a method for producing a waveguide according to a multi-drawing method. In this case, a plurality of waveguides 1 are assembled in order to form a preform 30 and are drawn lengthwise (FIG. 9*a*). The waveguides 1 may in this case, for example, be an arrangement of structural elements 10, 20, and respectively 10*a*, *b*, for example according to FIG. 3, or alternative assemblies for example according to those in FIG. 1*a* to 1*e*, which preferably are already drawn in a known manner.

The assembled and lengthwise-drawn waveguides ("multi-fiber") are then divided into portions and again assembled into a preform 40 (FIG. 9*b*, "multi-multi assembly"). The preform 40 may then again be drawn lengthwise (FIG. 9*c*), and may optionally again be divided into portions and assembled (FIG. 9*d*). Lastly, the arrangement obtained in this way may be fused by applying heat and/or pressure, and particularly in a vacuum (FIG. 9*e*).

Figure 10A:
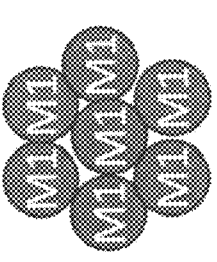
FIGS. 10*a*-10*d* show schematic cross sections of the waveguides assembled into a preform some being untwisted with respect to one another and others being rotated with respect to one another in a predefined way, respectively.
Figure 10B:
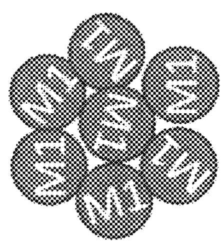
Figure 10C:
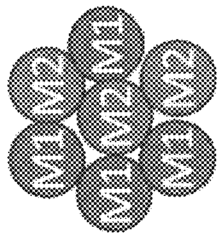
Figure 10D:
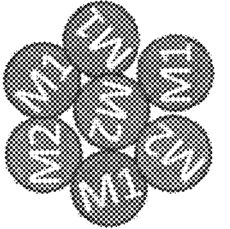

Referring to FIGS. 10*a*-10*d*, the lengthwise-drawn assembled waveguides ("multi-fiber, here "M1") may be assembled untwisted with respect to one another during the assembly into a further preform (FIG. 10*a*) or assembled rotated with respect to one another, particularly in a predefined way (FIG. 10*d*). Furthermore portions of at least two different lengthwise-drawn assembled waveguides ("M1", "M2") may be assembled untwisted (FIG. 10*c*) or rotated with respect to one another (FIG. 10*d*), particularly in a predefined way during the assembly. In a similar way to the arrangements shown in FIGS. 10*a*, 10*b*, the waveguides may also be arranged untwisted or rotated with respect to one another, particularly in a predefined way, during the assembly of the first preform. In the event that a preform is assembled from portions of at least two different waveguides ("M1", "M2"), the arrangement of these different waveguides may be carried out according to an above-described arrangement of different types of structural elements (for example FIG. 3), and may therefore again be uniquely established by a predetermined rule.

Referring to FIGS. 11*a* to 14*f*, various versions of the nonuniformity according to the invention of the structural elements will again be discussed by way of example below. As described, the structural elements, in particular the cross-sectional regions thereof, are on the one hand characterized by a nonuniformity in relation to one another, but on the other hand by a regularity insofar as the nonuniformity of the structural elements is uniquely predetermined, in particular is deterministic and/or reproducible, and does not follow chance.

For example, the structural elements, or the cross-sectional regions thereof, may have a nonuniform arrangement which is uniquely established by a predetermined rule, may have nonuniform geometries with respect to one another, which are uniquely established by a predetermined rule, and/or may have nonuniform refractive indices with respect to one another, which are uniquely established by a predetermined rule.

Figures 11A, 11B, 11C, 11D, 11E, 11F:
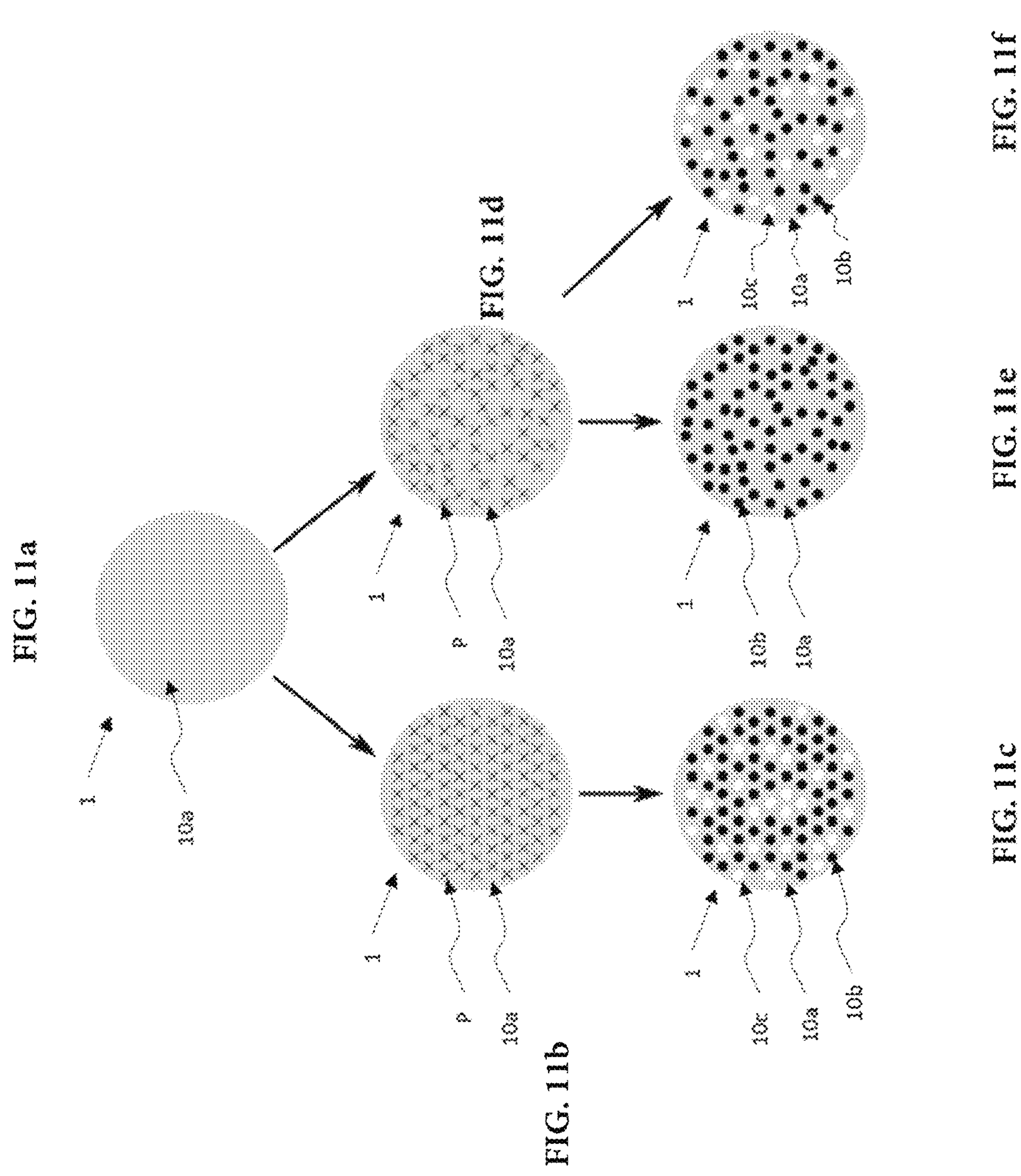
FIGS. 11*a*-11*f* show schematic illustration of various possibilities for waveguides with structural elements, or the cross-sectional regions thereof, which are configured nonuniformly but in a way which is uniquely established by a predetermined rule.

With the aid of a tree diagram, FIGS. 11*a*-11*f* shows various possibilities for producing a nonuniform arrangement which is uniquely established by a predetermined rule. FIG. 11*a* shows, as a starting point, a structural element 10*a* which may for example be configured as a matrix material (it is also possible for the structural element 10*a* to be configured as air or to be absent). FIG. 11*b* shows a further starting point, derived therefrom, with the structural element 10*a* as well as a multiplicity of periodic positions P for occupation with structural elements, which then have periodic positioning. FIG. 11*d* shows a further starting point derived from FIG. 11*a*, with the structural element 10*a* as well as a multiplicity of aperiodic positions P for occupation with structural elements, in order to achieve aperiodic positioning. On the basis of the starting points shown in FIG. 11*b* and 11*d*, waveguides according to the invention are obtained as described in more detail below by occupying the positions P with structural elements.

On the basis of FIG. 11*b*, FIG. 11*c* shows a waveguide 1 with structural elements 10*b*, 10*c*, the cross-sectional regions of which have periodic positioning and/or lie at periodic positions. The waveguide shown in FIG. 11*c* comprises three types of structural elements 10*a*, 10*b*, 10*c*, each of which may have a different refractive index. For example, the structural element 10*a* may be configured as a matrix material and the structural elements 10*b* and 10*c* may be cavities in the matrix material, which are filled with materials having different refractive indices.

It is, however, likewise possible for one of the materials of the structural elements 10*b* and 10*c* in turn to correspond to the matrix material of the structural element 10*a*, or for the (filled) cavities in the matrix material which correspond to these structural elements to be omitted (in this regard, see further below in relation to FIG. 13*a*). It is likewise possible for the structural element 10*a* to be configured as air, or to be absent, and for the structural elements 10*b* and 10*c* to be contiguous (in this regard, see further below in relation to FIG. 14*a*).

The waveguide 1 shown in FIG. 11*c* comprises structural elements 10*b*, 10*c* with periodic positioning. The structural elements 10*b*, 10*c* are however of different type, and the occupancy of the different types on the regular grid is nonuniform but is established by a predetermined rule. In particular, the variation of the structural elements 10*b*, 10*c* with respect to one another is therefore nonuniform but is established by a predetermined rule. The structural elements 10*b*, 10*c* may in particular be referred to as deterministically disordered. FIG. 11*c* therefore shows a case of a waveguide 1, the structural elements, or the cross-sectional regions thereof, having a nonuniform arrangement which is uniquely established by a predetermined rule. The term arrangement is in this case to be understood insofar as the selection, or occupancy, of the various types of structural elements 10*b*, 10*c* on the respective periodic positions is nonuniform but is established by the predetermined rule, that is to say it is not random.

It is furthermore possible that the structural elements 10*b*, 10*c* do not differ in respect of their refractive indices, that is to say for example they have the same refractive index, or consist of the same material, but vary in respect of other aspects (in this regard, see further below in relation to FIG. 12). It is furthermore possible for the structural elements 10*b*, 10*c* to differ both in respect of their refractive indices and in respect of other aspects.

On the basis of FIG. 11*d*, FIG. 11*e* shows a waveguide 1 with two types of structural elements, namely the structural element 10*a*, which may for example be configured as a matrix material, and a multiplicity of structural elements 10*b*, which may for example be configured as cavities, in particular filled cavities, in the matrix material. The cross-sectional regions of the structural elements 10*b* are in this case positioned aperiodically. The positioning of the structural elements 10*b* may in this case then represent the nonuniformity which is established by a predetermined rule. In particular, the structural elements 10*b* of the second type may have positions which are nonuniform but established by a predetermined rule. FIG. 11*e* therefore shows a case of a waveguide 1, the structural elements, or the cross-sectional regions thereof, having a nonuniform arrangement which is uniquely established by a predetermined rule. The term arrangement is in this case to be understood insofar as the structural elements or some of the structural elements, or the cross-sectional regions thereof, are positioned aperiodically, the positions being established by the predetermined rule, that is to say not being random. In the case of FIG. 11*e*, it is provided in particular that the structural elements 10*b* of the second type have a uniform refractive index, have uniform geometries and/or are configured uniformly, in particular configured identically, in respect of other aspects. This case may be referred to as uniform occupancy of the aperiodic positions.

FIG. 11*f* on the other hand, on the basis of FIG. 11*d*, shows a waveguide 1 in which aperiodic positioning of structural elements with simultaneously different types of structural elements 10*b*, 10*c* are provided. In this case, the nonuniformity which is uniquely established by a predetermined rule may consist in the aperiodic positioning of the structural elements 10*b*, 10*c* or in the occupancy, that is to say the variation of the structural elements 10*b*, 10*c* with respect to one another, or both in the positioning and in the occupancy.

Figure 12:
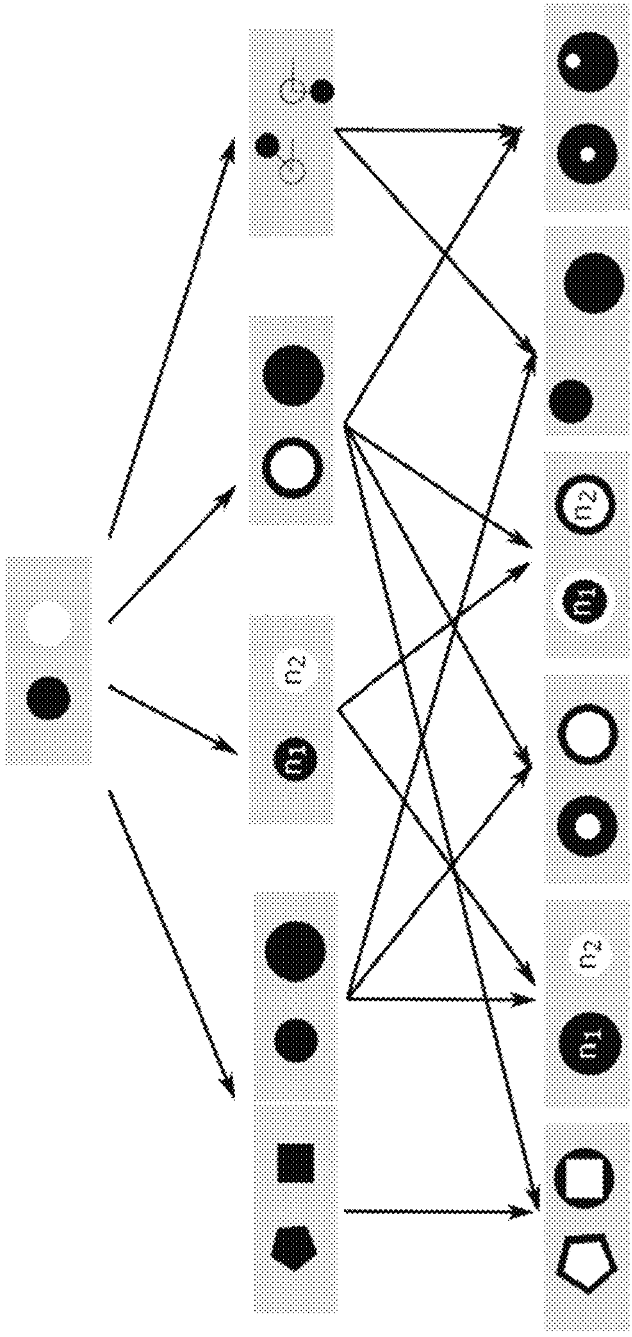
FIG. 12 shows a schematic illustration of various aspects for variations among structural elements, or the cross-sectional regions thereof, and possibilities for combinations of these aspects.

FIG. 12 shows various possibilities of variations which structural elements may have with respect to one another (central row) as well as exemplary combination possibilities, not to be regarded as exhaustive, of the variations (lower row). The variations shown may be used in particular for an occupancy of positions with structural elements which is configured nonuniformly but is uniquely established by a predetermined rule. Structural elements, the cross-sectional regions of which are located on periodic or else aperiodic positions, for example inside a matrix material, may for example vary with respect to one another in respect of their shape, in respect of their type or refractive index, in respect of their substructure and/or in respect of their rotation (and/or local position).

For example, variations of the geometries of the structural elements, in particular the cross-sectional regions thereof, may be configured as variations of the shape (number of vertices, diameter). Variations of the geometry may also be configured as variations of the substructure. A substructure may in particular consist in a structural element, in particular the cross-sectional region thereof, comprising at least two different zones with different refractive indices, in particular a core and a surrounding cladding (core-cladding system).

In combination, for example, a first type of structural elements may comprise a polygonal cladding and/or a polygonal core, and a second type of structural elements may comprise a round cladding and a polygonal core (lower row, first column). These two types of structural elements may then, for example, be used for occupying periodic or else aperiodic positions.

Furthermore, for example, a first type of structural elements may have a first refractive index and a first diameter, and a second type of structural elements may have a second refractive index and a second diameter (lower row, second column); or a first type of structural elements may comprise a core-cladding system with a core having a first diameter and a second type of structural elements may comprise a core-cladding system with a core having a second diameter (lower row, third column); or a first type of structural elements may comprise a core-cladding system with a core having a first refractive index and a second type of structural elements may comprise a core-cladding system with a core having a second refractive index (lower row, fourth column); or a first type of structural elements may have a first diameter and a rotation about a point of rotation lying outside the structural element and a second type of structural elements may have a second diameter and a rotation about a point of rotation lying outside the structural element (lower row, fifth column), or a first type of structural elements may comprise a core-cladding system with a centered core and a second type of structural elements may comprise a core-cladding system with a core having a rotation about a point of rotation lying outside the core (lower row, sixth column), and so on.

Figure 13B:
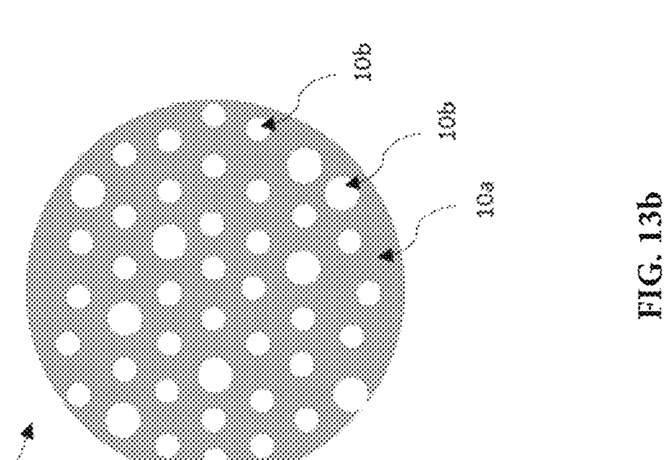
FIGS. 13*a*-13*b* shows schematic illustrations of various further possibilities for waveguides with structural elements, or the cross-sectional regions thereof, which are configured nonuniformly but in a way which is uniquely established by a predetermined rule, the waveguides respectively comprising a structural element of a first type and a multiplicity of structural elements of a second type.
Figure 13A:
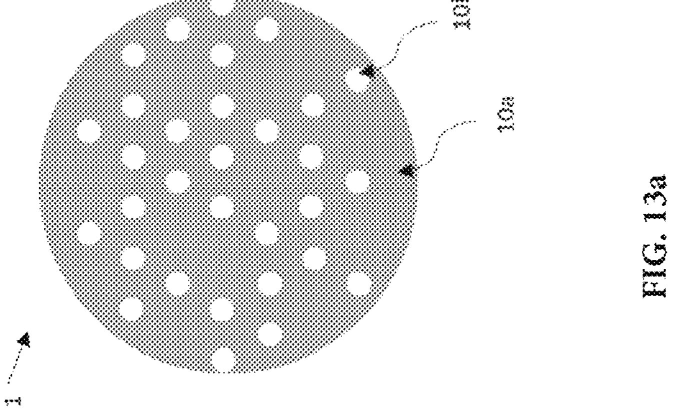

FIG. 13*a* shows a waveguide 1 which is respectively comparable to the waveguide of FIG. 11*c* in some aspects. The waveguide comprises a first structural element 10*a*, which may for example be configured as a matrix material. The waveguide furthermore comprises a multiplicity of structural elements 10*b*, which may for example be configured as filamented cavities in the matrix material. The structural elements 10*b* lie at periodic sites, but not all the periodic sites are occupied by a structural element. FIG. 13*a* therefore shows a case of a waveguide 1, the structural elements, or the cross-sectional regions thereof, having a nonuniform arrangement which is uniquely established by a predetermined rule. The term arrangement is in this case to be understood insofar as the structural elements or some of the structural elements, or the cross-sectional regions thereof, lie at periodic sites, some of the periodic sites being occupied and some of the periodic sites being unoccupied, and the occupancy being configured in such a way that it is uniquely established by a predetermined rule, that is to say it is not random.

FIG. 13*b* shows a waveguide 1 which is respectively comparable to the waveguide of FIG. 11*f* in some aspects. The waveguide comprises a first structural element 10*a*, which may for example be configured as a matrix material. The waveguide furthermore comprises a multiplicity of structural elements 10*b* with a first diameter and a multiplicity of structural elements 10*c* with a second diameter. The structural elements are in this example positioned aperiodically, wherein the aperiodic positioning may be configured to be nonuniform but uniquely established by a predetermined rule. FIG. 13*b* therefore shows a case of a waveguide 1, the structural elements, or the cross-sectional regions thereof, having a nonuniform arrangement which is uniquely established by a predetermined rule. The term arrangement is in this case to be understood insofar as the structural elements or some of the structural elements, or the cross-sectional regions thereof, are positioned aperiodically, the aperiodic positions being established by the predetermined rule, that is to say not random, and/or the structural elements having a variation with respect to one another which is configured nonuniformly but in a way which is uniquely established by a predetermined rule, the variation being configured as two types of structural elements, for example with different diameters.

Figures 14A, 14B, 14C, 14D, 14E, 14F:
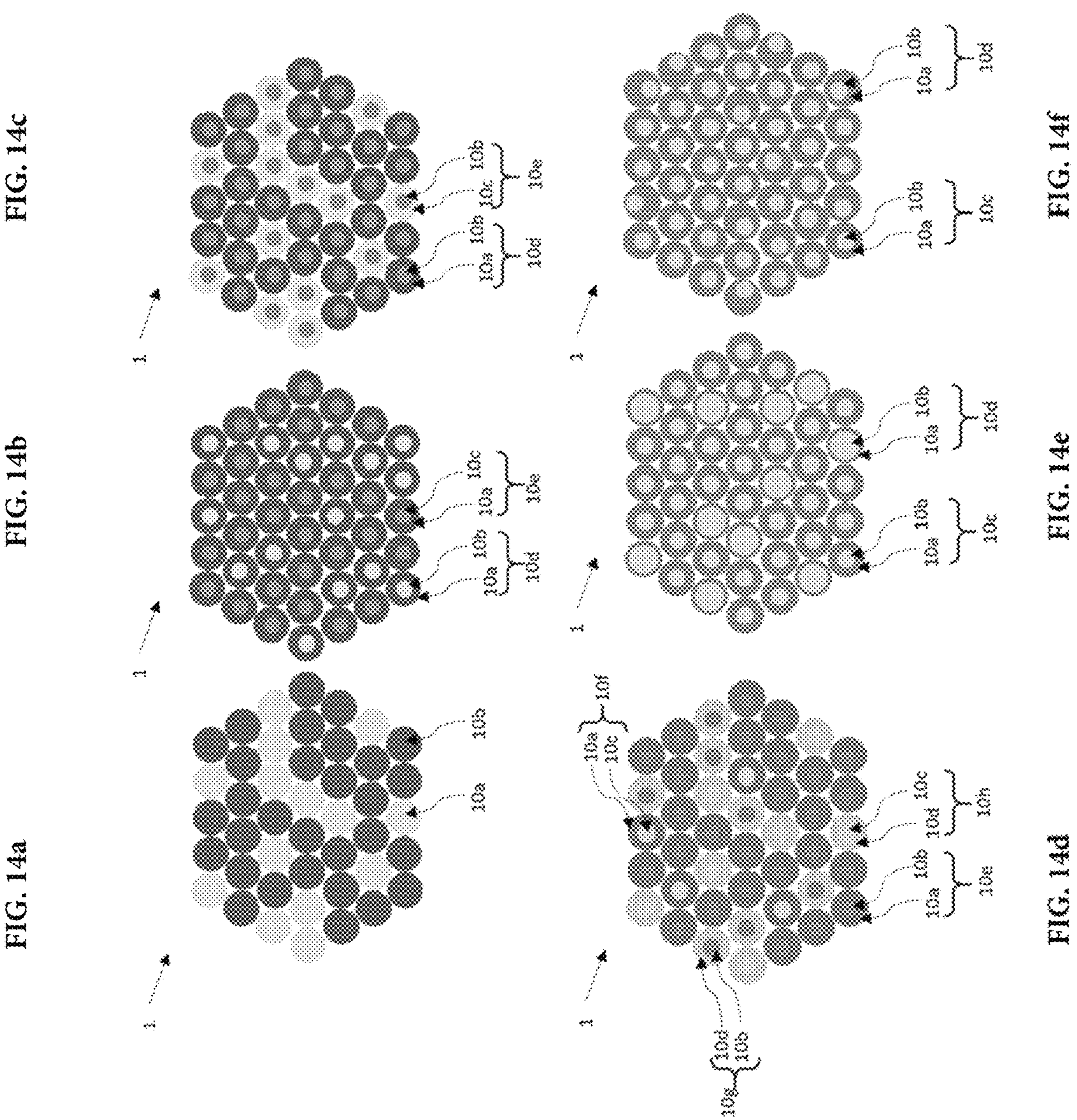
FIGS. 14*a*-14*f* show schematic illustrations of various further possibilities for waveguides with structural elements, or the cross-sectional regions thereof, which are configured nonuniformly but in a way which is uniquely established by a predetermined rule, the waveguides respectively comprising a multiplicity of structural elements of a first type and a multiplicity of structural elements of a second type, and optionally further types.

FIGS. 14*a*-14*f* shows some waveguides 1 respectively having a multiplicity of structural elements of a first type and a multiplicity of structural elements of a second type (and optionally with further types in FIG. 14*d*). The waveguides 1 shown here in particular do not have a matrix material (that is to say in particular they are not configured as a faceplate either), but instead the structural elements are contiguous. The waveguides 1 shown in FIGS. 14*a*-14*f* have the common feature that the structural elements of the different types, in particular the cross-sectional regions thereof, are positioned periodically although the occupancy of the periodic positions with the types of structural elements is configured nonuniformly but in a way which is uniquely established by a predetermined rule. The waveguides 1 shown in FIGS. 14*a*-14*f* are therefore distinguished in that the structural elements, or the cross-sectional regions thereof, have a nonuniform arrangement which is uniquely established by a predetermined rule, wherein the term arrangement is in this case to be understood insofar as the selection or occupancy of the different types of structural elements on the periodic positions is nonuniform but established by the predetermined rule, that is to say it is not random.

FIG. 14*a* shows for instance a waveguide 1 with a multiplicity of structural elements 10*a* and a multiplicity of structural elements 10*b*, which have different refractive indices.

FIG. 14*b* shows a waveguide 1 with a multiplicity of structural elements 10*d* and a multiplicity of structural elements 10*e*, which have different refractive indices and a different substructure, the substructure being defined by the sub-structural elements 10*a* and 10*b* (with refractive indices a and b) and respectively 10*a* and 10*c* (with refractive indices a and c). The substructure consists here in the structural elements 10*d* and 10*e* being configured as core-cladding systems, the cores being different.

FIG. 14*c* similarly shows a waveguide 1 with a multiplicity of structural elements 10*d* and a multiplicity of structural elements 10*e*, which have different refractive indices and a different substructure, the substructure being defined by the sub-structural elements 10*a* and 10*b* (with refractive indices a and b) and respectively 10*c* and 10*b* (with refractive indices c and b). The substructure consists here in the structural elements 10*d* and 10*e* being configured as core-cladding systems, the claddings being different.

FIG. 14*d* similarly shows a waveguide 1 with a multiplicity of structural elements 10*e*, a multiplicity of structural elements 10*f*, a multiplicity of structural elements 10*g*, and a multiplicity of structural elements 10*h*, which have different refractive indices and a different substructure, the substructure being defined by the sub-structural elements 10*a* and 10*b* (with refractive indices a and b) and respectively 10*a* and 10*c* (with refractive indices a and c), and respectively 10*b* and 10*d* (with refractive indices b and d), and respectively 10*c* and 10*d* (with refractive indices c and d). The substructure consists here in the structural elements 10*e*, 10*f*, 10*g* and 10*h* being configured as core-cladding systems, both the claddings and the cores being different.

FIG. 14*e* shows a waveguide 1 with a multiplicity of structural elements 10*c* and a multiplicity of structural elements 10*d*, which have different geometries and a different substructure, the substructure of the structural element 10*c* being defined by the sub-structural elements 10*a* and 10*b* (with refractive indices a and b and a first core diameter), and the substructure of the structural element 10*d* being defined by the sub-structural elements 10*a* and 10*b* (with refractive indices a and b and a second core diameter).

FIG. 14*f* shows a waveguide 1 with a multiplicity of structural elements 10*c* and a multiplicity of structural elements 10*d*, which have different geometries and a different substructure, the substructure of the structural element 10*c* being defined by the sub-structural elements 10*a* and 10*b* (with refractive indices a and b and a centrally positioned core), and the substructure of the structural element 10*d* being defined by the sub-structural elements 10*a* and 10*b* (with refractive indices a and b and an eccentrically positioned core positioned).

Figure 15B:
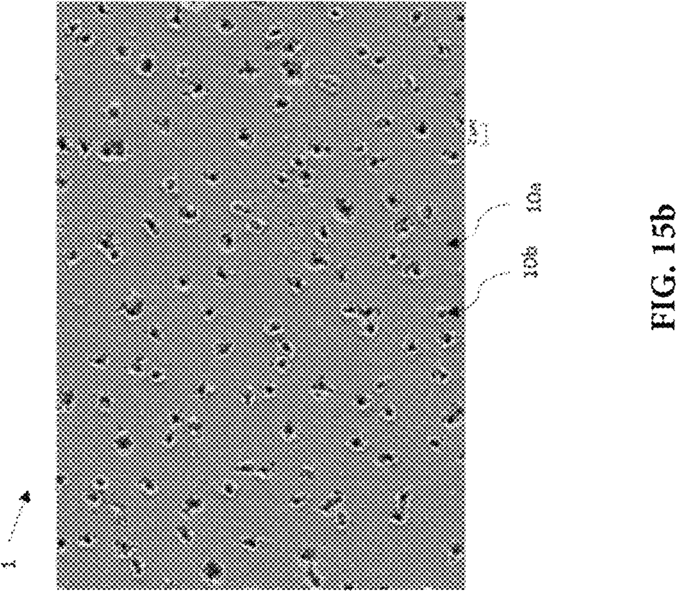
FIGS. 15*a*-15*b* show pictures of the end side of produced waveguides configured with a structural element of a first type and a multiplicity of structural elements of a second type configured as filamentary channels in the structural element of the first type.
Figure 15A:
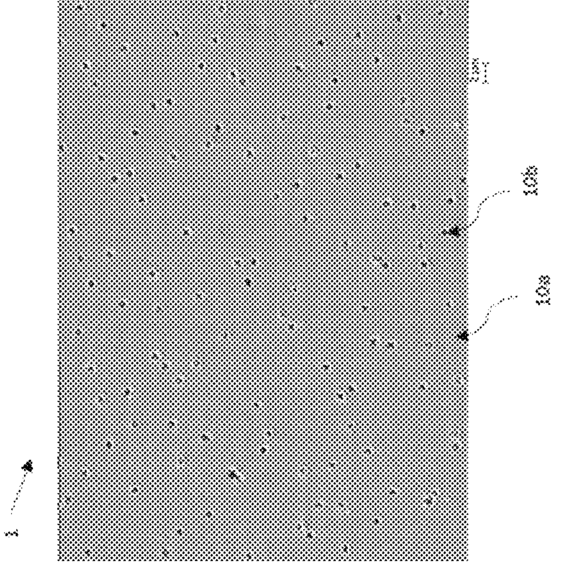

FIG. 15*a* and FIG. 15*b* show pictures as examples of waveguides 1 produced in practice, with a monolithic base body as a structural element of the first type 10*a*, in which a multiplicity of filamentary channels have been introduced as structural elements of the second type 10*b* by means of laser filamentation, these having aperiodic positioning and the aperiodic positions being configured nonuniformly but in a way which is uniquely established by a predetermined rule. During the laser filamentation, for example, provision may however also be made that the laser scans the substrate row-by-row, from which a periodicity or a raster is obtained. Particularly in such a case, the structural elements of the second type 10*b*, configured as filamentary channels, may also be positioned at periodic sites, some of the periodic sites being occupied and some of the periodic sites being unoccupied, and the occupancy being configured in such a way that it is uniquely established by a predetermined rule.

Figures 16A, 16B:
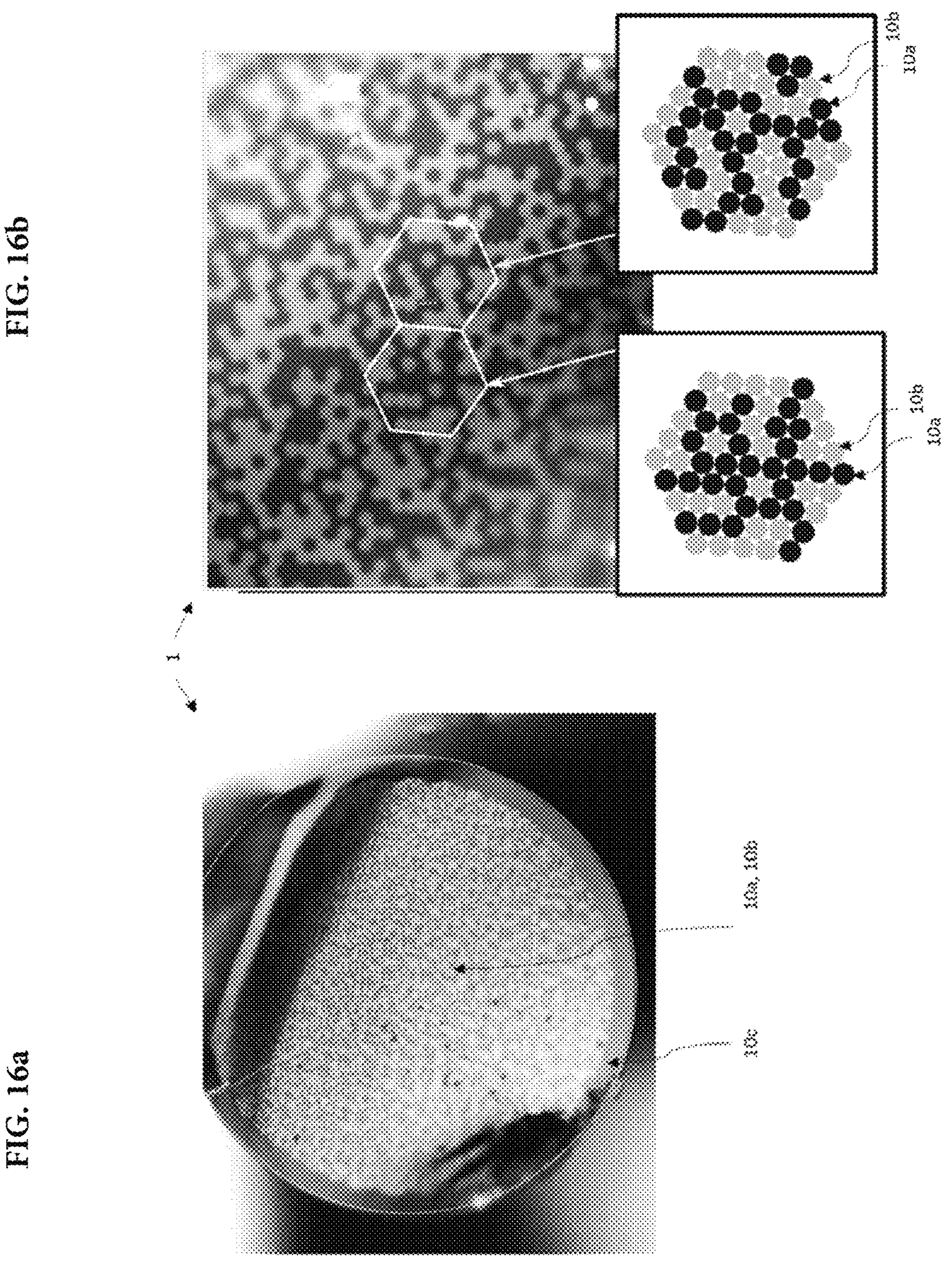
FIGS. 16*a*-16*b* show pictures and enlarged details of a produced waveguide with a multiplicity of structural elements of a first type and a multiplicity of structural elements of a second type.

FIG. 16*a* shows a picture as an example of a waveguide 1 produced in practice, with a multiplicity of fibers having a first refractive index as structural elements of the first type 10*a* and a multiplicity of fibers having a second refractive index as structural elements of the second type 10*b*, as well as an enlarged view and diagrams thereof in FIG. 16*b*. The fibers of the structural elements 10*a* and 10*b* are in this case contiguous and are positioned according to a periodic grid, the occupancy of the positions with the types 10*a* and 10*b* being configured nonuniformly but in a way which is uniquely established by a predetermined rule. The structural elements of the first type 10*a* and of the second type 10*b* may be surrounded by a structural element of a third type 10*c* configured as a sheath. Preferably, the sheath in this case has a refractive index which is less than both the refractive index of the structural elements of the first type 10*a* and the refractive index of the second type 10*b*.

Figure 17:
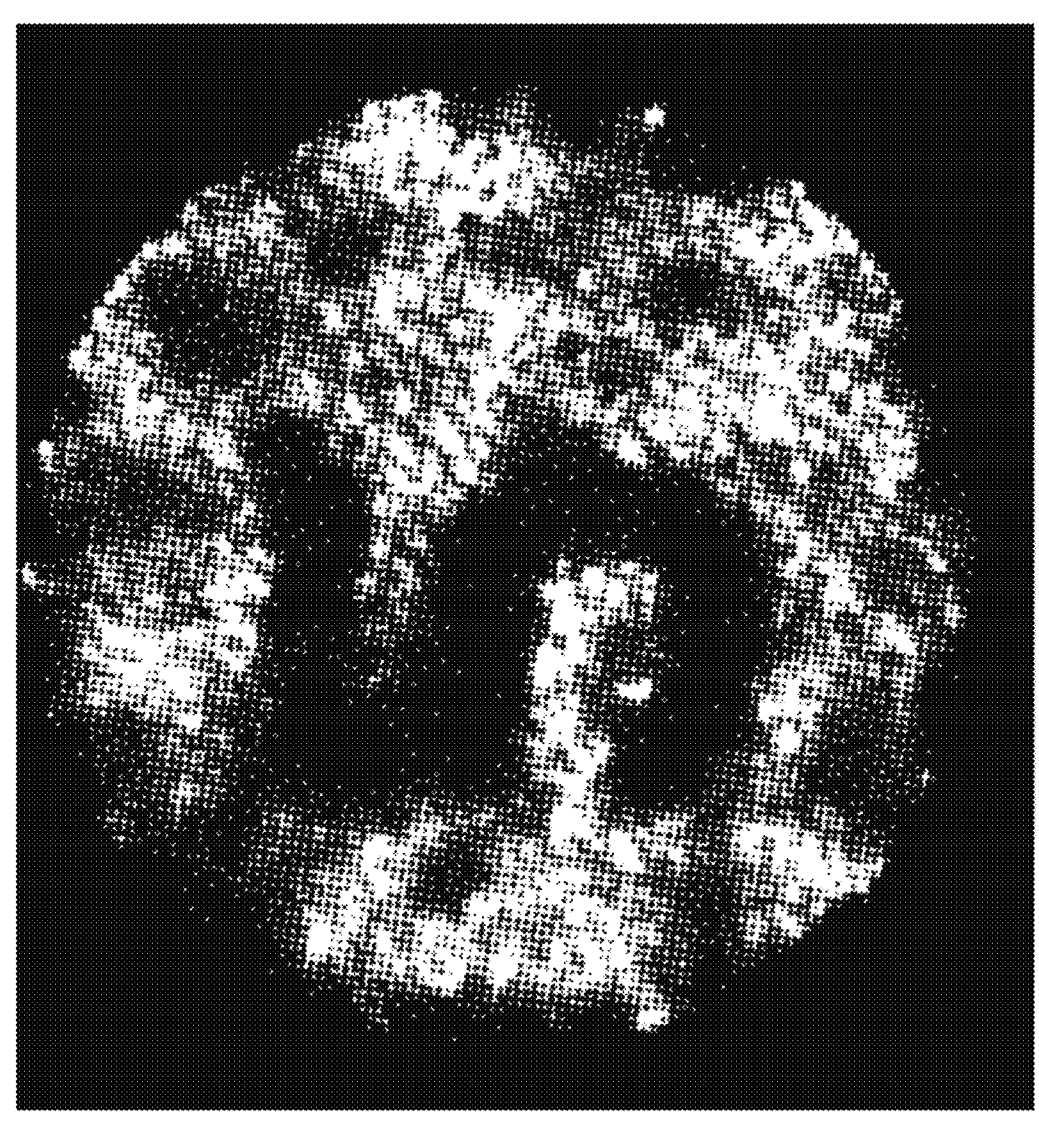
FIG. 17 shows a picture of the waveguide of FIG. 16 in its use as an image guide.

FIG. 17 shows a picture of the waveguide 1 of FIG. 16*a* in its application as an image guide, an image which shows the number 5 being transmitted. Because of the nonuniformity in the arrangement of the structural elements, image transmission is in this case achieved with a high resolution based on the phenomenon of transverse Anderson localization. At the same time, locally controllable image sharpness and homogeneity are in this case made possible because of the arrangement according to the predetermined rule.

In summary, for example, a waveguide 1 may be provided, the structural elements, in particular the cross-sectional regions thereof, having a nonuniform arrangement which is uniquely established by a predetermined rule, the nonuniform arrangement which is uniquely established by the predetermined rule being configured as periodic positioning of structural elements, in particular the cross-sectional regions thereof, the periodically positioned structural elements having a variation with respect to one another which is configured nonuniformly but in a way which is uniquely established by a predetermined rule, the variation of the periodically positioned structural elements with respect to one another preferably being configured as a variation of the type of the structural elements, of the refractive index of the structural elements and/or of the geometry (for example the shape, the diameter and/or the substructure) of the structural elements, (b) as aperiodic positioning of structural elements, in particular the cross-sectional regions thereof, the aperiodic positions of the structural elements being configured nonuniformly but in a way which is uniquely established by a predetermined rule, the structural elements optionally furthermore having a variation with respect to one another which is configured nonuniformly but in a way which is uniquely established by a predetermined rule, and/or (c) as positioning of structural elements, in particular the cross-sectional regions thereof, on periodic sites, some of the periodic sites being occupied and some of the periodic sites being unoccupied, and the occupancy being configured in such a way that it is uniquely established by a predetermined rule, the structural elements optionally furthermore having a variation with respect to one another which is configured nonuniformly but in a way which is uniquely established by a predetermined rule.

As described above, the structural elements may also differ from one another in their shape or geometry. Particularly in the event that the waveguide is formed as a fiber rod by means of a preform fiber drawing method, optionally repeated several times, the initial shapes or geometries may be preserved but also represented as being deformed because of the thermal influences in the waveguide, and the mechanical influences possibly occurring in this case. In particular, at least some structural elements may assume a hexagonal and/or hyperbolically polygonal shape, in particular triangular or hexagonal. The introduction of structural elements by means of laser methods may also comprise such geometrical variations, for example by the laser beam or a laser beam, or the laser radiation, being correspondingly guided and/or the beam profile thereof being optically adjusted.

What is claimed is:

1. A waveguide for transmitting electromagnetic waves from a proximal end to a distal end along a transport direction and over a cross section running transversely with respect to the transport direction, the waveguide comprising:

a first multiplicity, the first multiplicity comprising a plurality of structural elements having at least two different types of structural elements, the at least two different types of structural elements comprises a first type with a first refractive index and a second type with a second refractive index that is different than the first refractive index, wherein the first multiplicity extends along the transport direction and partly over the cross section in such a way that a multiplicity of cross-sectional regions are defined in the cross section, each of which correspond to the cross section of an individual structural element, and wherein the plurality of structural elements are configured in the first multiplicity nonuniformly but in a way which is uniquely established by a predetermined rule such that transverse Anderson localization occurs in the first multiplicity, wherein the predetermined rule contains detailed information for describing and/or constructing the waveguide in its structure formed by the multiplicity of structural elements.

2. The waveguide of claim 1, wherein the plurality of structural elements have a feature selected from a group consisting of a nonuniform arrangement, nonuniform cross sectional geometries, nonuniform diameters, nonuniform refractive indices, and any combinations thereof.

3. The waveguide of claim 1, wherein the plurality of structural elements are configured nonuniformly in the first multiplicity such that transmitted electromagnetic waves remain localized in a direction running transversely with respect to the transport direction.

4. The waveguide of claim 1, wherein the plurality of structural elements are configured in such a way that the first multiplicity has a reproducible structure.

5. The waveguide of claim 1, wherein the plurality of structural elements are invariant along the transport direction.

6. The waveguide of claim 1, wherein the predetermined rule comprises indicating a characteristic parameter for each plurality of structural element of the area of the cross-sectional region or of the refractive index of the respective structural element, according to a deterministic specification.

7. The waveguide of claim 1, wherein the predetermined rule comprises a mathematical series of fixed values configured as a series selected from a group consisting of a low discrepancy series, a deterministic series, a Halton series, a Sobol series, a Niederreiter series, a Hammersley series, a Faure series, and any combinations thereof.

8. The waveguide of claim 1, wherein the predetermined rule comprises:

picking a particular value of a deterministic series in order to indicate a characteristic parameter for a particular structural element, picking a further value of the deterministic series in order to indicate a characteristic parameter for a further structural element, checking whether the value or the characteristic parameter for the further structural element violates a defined condition, and if the defined condition is violated, and discarding the further value and picking yet another value of the deterministic series in order to indicate a characteristic parameter for the further structural element, or modifying the further value in a predefined way such that the defined condition is satisfied or no longer violated.

9. The waveguide of claim 8, wherein the defined condition is configured as a fixed minimum difference of the values or characteristic parameters.

10. The waveguide of claim 1, wherein the distribution of the area contents of Voronoi cells with respect to the positions of the cross-sectional areas of the structural elements of at least one type fulfills at least one of the following conditions:

(1) variance $V_d$ of the distribution is less than the variance $V_z$ of a corresponding distribution for random positions of the cross-sectional areas, the ratio $V_z/V_d$ lying between 0 and 10, and/or (2) variance Va of the distribution is less than $0.38/N^{2.033}$, where N denotes the number of structural elements of the at least one type, and/or (3) variance Va of the distribution is greater than the variance of a corresponding distribution for periodic positions of the cross-sectional areas, the variance $V_d$ being greater than 0.

11. The waveguide of claim 1, further comprising a ratio of the total area of the cross-sectional regions of the structural elements of the first type and the total area of the cross-sectional regions of the structural elements of the second type lies in a range of between 1:9 and 9:1, and/or wherein the total area of the cross-sectional regions of the structural elements for each type is at least 1/(10*T), where T denotes the number of types, and/or wherein the first refractive index of the structural elements of the first type and the second refractive index of the structural elements of the second type differ by at least $10^{-4}$.

12. The waveguide of claim 1, wherein at least one cross-sectional region has a diameter of from 100 nm to 50 μm, and/or wherein at least one cross-sectional region has a diameter which lies between 0.1 times and 10 times the average wavelength, and/or wherein at least one cross-sectional region has a polygonal geometry.

13. The waveguide of claim 1, wherein one structural element of the first type is configured as a base body comprising a first medium having the first refractive index and the structural elements of the second type are configured as cavities in the base body, wherein the cavities form the second refractive index.

14. The waveguide of claim 13, wherein the cavities are configured as filamentary channels introduced into the base body by a laser beam of an ultrashort-pulse laser and are chemically finished by etching to smooth the contours of the channels.

15. The waveguide of claim 13, wherein the cavities are formed by additive construction of the base body and/or are introduced subtractively into the base body as mechanical bores.

16. The waveguide of claim 13, wherein the cavities are filled with a second medium, the second medium having the second refractive index.

17. The waveguide of claim 1, comprising an area of at least 4 square millimeters in cross section, and/or comprising an extent in cross section which is at least 2 times greater than the extent along the transport direction.

18. The waveguide of claim 1, comprising an extent of less than 10 millimeters along the transport direction and configured as a faceplate.

19. The waveguide of claim 1, comprising an extent of greater than 10 millimeters along the transport direction.

20. The waveguide of claim 1, wherein the predetermined rule comprises detailed information for describing and/or constructing the first multiplicity.

21. The waveguide of claim 1, wherein the predetermined rule comprises detailed information for describing and/or constructing each of the cross-sectional regions of the first multiplicity.

22. The waveguide of claim 1, wherein the predetermined rule comprises a deterministic rule.

23. The waveguide of claim 1, further comprising:

a second multiplicity, the second multiplicity comprising a plurality of second structural elements having at least two different types of second structural elements, wherein the second multiplicity extends along the transport direction and partly over the cross section, and wherein the plurality of second structural elements are configured in the second multiplicity nonuniformly but in a way which is uniquely established by the predetermined rule such that transverse Anderson localization occurs in the second-multiplicity.

24. The waveguide of claim 23, wherein the first and second multiplicity are the same or different.

25. A waveguide for transmitting electromagnetic waves from a proximal end to a distal end along a transport direction and over a cross section running transversely with respect to the transport direction, the waveguide comprising:

a first multiplicity, the first multiplicity comprising a plurality of structural elements having at least two different types of structural elements configured such that transverse Anderson localization occurs in the first multiplicity, wherein the first multiplicity extends along the transport direction and partly over the cross section in such a way that a multiplicity of cross-sectional regions are defined in the cross section, each of which correspond to the cross section of an individual structural element, wherein the plurality of structural elements are configured aperiodically within the first multiplicity in such a way which is uniquely established by a predetermined rule, wherein the predetermined rule contains detailed information for describing and/or constructing the waveguide in its structure formed by the multiplicity of structural elements.

26. The waveguide of claim 25, further comprising:

a second multiplicity, the second multiplicity comprising a plurality of second structural elements having at least two different types of second structural elements, wherein the second multiplicity extends along the transport direction and partly over the cross section, and wherein the plurality of second structural elements are configured aperiodically within the second multiplicity in such a way which is uniquely established the predetermined rule.

27. The waveguide of claim 26, wherein the first and second multiplicity are the same or different.

28. A waveguide for transmitting electromagnetic waves from a proximal end to a distal end along a transport direction and over a cross section running transversely with respect to the transport direction, the waveguide comprising:

a first multiplicity, the first multiplicity comprising a plurality of structural elements having at least two different types of structural elements configured such that transverse Anderson localization occurs in the first multiplicity, wherein the first multiplicity extends along the transport direction and partly over the cross section in such a way that a multiplicity of cross-sectional regions are defined in the cross section, each of which correspond to the cross section of an individual structural element, wherein the plurality of structural elements deviate from symmetry within the first multiplicity in such a way that is uniquely established by a predetermined rule, wherein the predetermined rule contains detailed information for describing and/or constructing the waveguide in its structure formed by the multiplicity of structural elements.

29. The waveguide of claim 28, further comprising:

a second multiplicity, the second multiplicity comprising a plurality of second structural elements having at least two different types of second structural elements, wherein the second multiplicity extends along the transport direction and partly over the cross section, and wherein the plurality of second structural elements deviate from symmetry within the second multiplicity in such a way that is uniquely established by the predetermined rule.

30. The waveguide of claim 29, wherein the first and second multiplicity are the same or different.

* * * * *